United States Patent
Guo et al.

(10) Patent No.: US 10,635,128 B1
(45) Date of Patent: Apr. 28, 2020

(54) STORING BACKUP DATA USING SNAPSHOTS

(71) Applicant: Veritas Technologies LLC, Mountain View, CA (US)

(72) Inventors: Fanglu Guo, Los Angeles, CA (US); Weibao Wu, Vadnais Heights, MN (US); Kirk L. Searls, Maitland, FL (US)

(73) Assignee: Veritas Technologies LLC, Santa Clara, CA (US)

( * ) Notice: Subject to any disclaimer, the term of this patent is extended or adjusted under 35 U.S.C. 154(b) by 164 days.

(21) Appl. No.: 13/663,122

(22) Filed: Oct. 29, 2012

(51) Int. Cl.
*H04L 1/00* (2006.01)
*G06F 1/04* (2006.01)

(52) U.S. Cl.
CPC ..................... *G06F 1/04* (2013.01)

(58) Field of Classification Search
CPC .................................................. G06F 2201/84
See application file for complete search history.

(56) References Cited

U.S. PATENT DOCUMENTS

| | | | | |
|---|---|---|---|---|
| 6,779,095 B2* | 8/2004 | Selkirk | .................... | G06F 3/065 711/114 |
| 7,174,352 B2* | 2/2007 | Kleiman | ............. | G06F 11/1435 |
| 7,287,045 B2* | 10/2007 | Saika | .................... | G06F 11/1451 |
| 7,356,679 B1* | 4/2008 | Le | ........................ | G06F 9/45558 713/1 |
| 8,135,677 B2* | 3/2012 | Matsuzawa et al. | ......... | 707/649 |
| 8,281,093 B1* | 10/2012 | Krishnan et al. | ............. | 711/162 |
| 8,965,850 B2* | 2/2015 | Varadarajan | .................... | 707/646 |
| 2005/0038836 A1* | 2/2005 | Wang | ............................. | 707/204 |
| 2006/0174075 A1* | 8/2006 | Sutoh | ............................ | 711/162 |
| 2007/0266062 A1* | 11/2007 | Young | ................. | G06F 11/1004 |
| 2008/0082593 A1* | 4/2008 | Komarov | ............ | G06F 11/1451 |
| 2009/0222496 A1* | 9/2009 | Liu | ........................ | G06F 3/0482 |
| 2010/0228913 A1* | 9/2010 | Czezatke | ............ | G06F 11/1451 711/112 |
| 2014/0052692 A1* | 2/2014 | Zhang | ................ | G06F 17/30088 707/639 |

OTHER PUBLICATIONS

Symantec Veritas; 2005; Veritas Software Corporation; pp. 1-5.*
Lei Yu; SNPdisk: An Efficient Para-Virtualization Snapshot Mechanism for Virtual Disks in Private Clouds; IEEE; Jul./Aug. 2011; pp. 20-26 (Year: 2011).*

* cited by examiner

*Primary Examiner* — Mariela Reyes
*Assistant Examiner* — Jermaine A Mincey
(74) *Attorney, Agent, or Firm* — Campbell Stephenson LLP

(57) ABSTRACT

The present disclosure describes storing backup images in backup storage using snapshots. In response to receipt of a backup image that includes a complete copy of client data, a storage unit is generated and the backup image is stored in the storage unit. In response to receipt of a streamlined backup image that includes changed client data and metadata identifying unchanged client data in a base backup image, a base storage unit that includes the base backup image is identified, a snapshot is taken of the base storage unit (which generates a snapshot), and the streamlined backup image is stored on the snapshot. The metadata of the streamlined backup image is analyzed to identify portions of the base backup image that are not referenced by the streamlined backup image, which are removed from the snapshot.

15 Claims, 14 Drawing Sheets

STORING BACKUP DATA USING SNAPSHOTS

FIELD OF THE INVENTION

The present invention relates to performing backup operations and, more particularly, to storing backup images using snapshots.

DESCRIPTION OF THE RELATED ART

An ever-increasing reliance on information and computing systems that produce, process, distribute, and maintain such information in its various forms, continues to put great demands on techniques for providing data storage and access to that data storage. Business organizations can produce and retain large amounts of data. While data growth is not new, the pace of data growth has become more rapid, the location of data more dispersed, and linkages between data sets more complex. Creating backup images of such data requires a significant amount of network resources.

BRIEF DESCRIPTION OF THE DRAWINGS

The present invention may be better understood, and its numerous objects, features and advantages made apparent to those skilled in the art by referencing the accompanying drawings.

Figure 1:
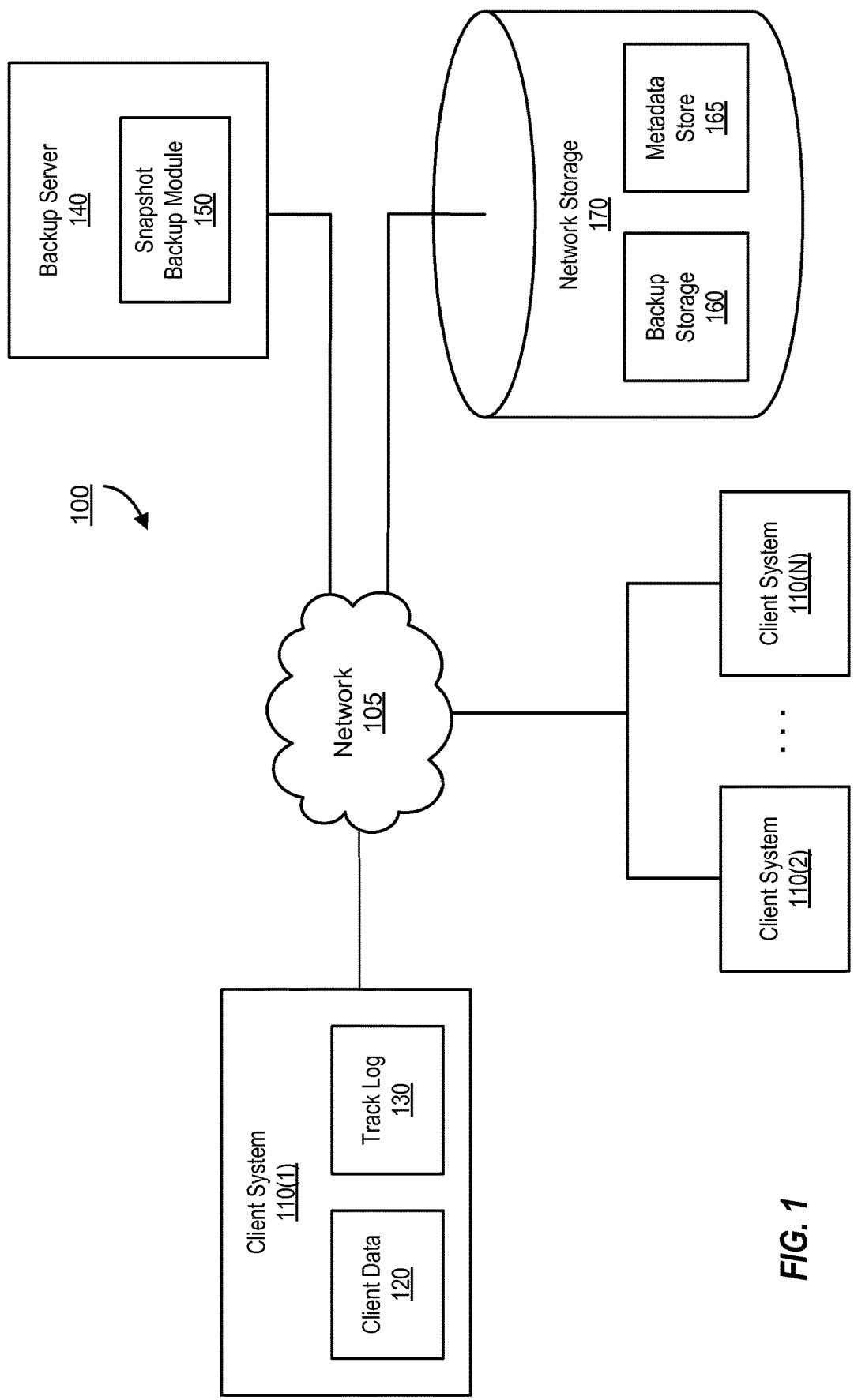
FIG. 1 is a simplified block diagram illustrating components of an example backup system in which the present disclosure can be implemented, according to one embodiment.

While the present disclosure is susceptible to various modifications and alternative forms, specific embodiments of the present disclosure are provided as examples in the drawings and detailed description. It should be understood that the drawings and detailed description are not intended to limit the present disclosure to the particular form disclosed. Instead, the intention is to cover all modifications, equivalents, and alternatives falling within the spirit and scope of the present disclosure as defined by the appended claims.

DETAILED DESCRIPTION

Overview

When performing a traditional backup process to create a full backup image of client data for a client device, a complete copy of the client data is transmitted to a backup server as the full backup image (also referred to herein as a traditional full backup image). The backup server receives the full backup image and stores the full backup image in backup storage. Each time a subsequent full backup image is created for the client device using the traditional backup process, another complete copy of the client data is transmitted to the backup server, even if the client data has not changed since the previous full backup image. Thus, creating traditional full backup images of a client device can take up a significant amount of network bandwidth and client processing bandwidth. Further, creating a traditional full backup image can also take up a significant amount of the backup server's local storage and processing bandwidth as the traditional full backup image is received from the client device and written to dedicated backup storage.

Rather than send a complete copy of client data each time a traditional backup image is created, a client device instead sends a copy of the changed client data to the backup server as part of a streamlined backup image. The client device locally tracks changes made to the client data using a change tracking log (or track log) in between backups, where information stored in the track log can be used to determine whether client data (e.g., files, file segments, or other portions of data) has or has not changed since the time a previous backup image was created. The previous backup image can be a traditional backup image or another streamlined backup image. The client device then transmits the client data that has changed (e.g., changed client data) as part of a streamlined backup image to the backup server. Since the amount of changed client data is likely to be less than the complete copy of client data, transmitting a streamlined backup image reduces the usage of network bandwidth and client processing bandwidth.

The client device also informs the backup server about client data that has not changed since the time a previous backup image was created (e.g., unchanged client data), where the previous backup image is already stored in backup storage. Since the unchanged client data has not changed since the previous backup image (and the previous backup image includes the unchanged client data), the previous backup image can be used as a base backup image from which the unchanged client data can be identified. The client device informs the backup server that the unchanged client data of the previous backup image should be included in the streamlined backup image, which is also referred to herein as an inclusion relationship between the streamlined backup image and the previous (or base) backup image. The inclusion relationship thus indicates a parent/child association between the streamlined backup image (i.e., child backup image) and the base backup image (i.e., parent backup image). The client device describes the inclusion relationship in metadata, and transmits the metadata as part of the streamlined backup image to the backup server, where the metadata identifies one or more locations in the previous backup image that contain the unchanged client data.

The backup server receives and stores the streamlined backup image (e.g., changed client data and metadata identifying unchanged client data) in backup storage. Since the streamlined backup image does not include a copy of unchanged client data that is already stored in backup storage (but instead references such data according to the inclusion relationship described in the metadata), the amount of client data stored in backup storage is reduced (as compared to storing a copy of both the changed and unchanged client data in backup storage). The backup server also performs data management of backup images stored in backup storage, such as keeping track of backup images generated for each client (where each client can have one or more backup policies), monitoring expiration dates for backup images, and reclaiming storage once a backup image has expired.

The present disclosure provides for improved data management of backup images by using snapshots to store backup images in backup storage. Example snapshots can include virtual disk snapshots, file system snapshots, and/or volume snapshots. A snapshot is generated from a storage unit and/or from another snapshot. Example storage units can include virtual disks, file systems, and/or volumes. A storage unit is created in backup storage to store a first backup image. A snapshot of the storage unit is created in backup storage to store a second backup image, where the second backup image has an inclusion relationship with the first backup image. In one embodiment, each storage unit and each snapshot stores a single backup image.

Snapshots have many advantages, such as being created quickly from a base storage unit, since data does not need to be copied over from the base storage unit (also referred to herein as a base unit) to the snapshot. Further, generating a snapshot from a base unit easily and quickly establishes a reference relationship between the snapshot and the base unit, which supports the inclusion relationship between backup images that are respectively stored in the snapshot and base unit. Additionally, virtual disks have many advantages, such as the ability to support fast failover and live migration, which improves disaster recovery and restore of backup images stored in virtual disks.

For example, a backup server receives a first (traditional) full backup image from a first client device that includes a complete copy of client data, and stores the first backup image in a first storage unit (e.g., a virtual disk, a file system, and/or a volume) in backup storage, where multiple storage units (e.g., virtual disks, file systems, and/or volumes) of client data from different client devices can be stored in backup storage. Subsequently, the backup server receives a streamlined backup image from the first client device, where the streamlined backup image has an inclusion relationship with the first backup image. A snapshot can be taken of the first storage unit (also referred to herein as a first unit), producing a snapshot that includes an array of pointers that reference, or point to, data (e.g., the first backup image) on the first unit. The array of pointers represents a copy of the first backup image on the snapshot. The streamlined backup image that refers to the first backup image is stored in the snapshot, where metadata of the streamlined backup image describes the inclusion relationship with the first backup image (and thus indicates which portions of the first backup image are included in the streamlined backup image). Similarly, subsequent to receipt of the streamlined backup image, a second streamlined backup image is received from the first client device, where the second streamlined backup image has an inclusion relationship with the streamlined backup image. A snapshot can be taken of the (first) snapshot, producing a second snapshot that includes an array of pointers that reference data on the (first) snapshot. The second streamlined backup image is stored in the second snapshot, where metadata of the second streamlined backup image describes the inclusion relationship with the streamlined backup image.

Further, to save space in backup storage, unused spaces in the snapshot are deleted and references to the base unit are removed. Continuing the above example, the streamlined backup image includes client data has changed since the first backup image was created. The streamlined backup image also includes metadata that identifies portions of unchanged client data that are included in the first backup image, which indicates that those portions are referenced by the streamlined backup image. Any portions of the first backup image that are not referenced by the streamlined backup image (e.g., portions of the first backup image that have been overwritten or replaced by other portions of the streamlined backup image) are identified for removal from the snapshot (but the identified portions are not removed from the first backup image). The pointers that reference, or point to, the identified portions of the first backup image on the first unit are removed from the array of pointers on the snapshot. Thus, according to the present disclosure, successive streamlined backup images of a client device can be stored on successive snapshots, where the chain of snapshots can be likened to a history of mirrors of the client device.

When a backup image expires, the unit (e.g., virtual disk, virtual disk snapshot, file system, file system snapshot, volume, and/or volume snapshot) storing the expired backup image also expires. In one embodiment, the portions of the expired backup image that are referenced by a second backup image can be copied over to a successive snapshot that stores the second backup image, and the expired unit and any snapshot pointers of the successive snapshot that refer to the expired unit are deleted. In another embodiment, the portions of the expired backup image that are referenced by a second backup image are maintained in the expired unit for use by the second backup image, while the remaining portions of the backup image (which are not referenced by another backup image) are deleted from the expired unit. In such an embodiment, the snapshot pointers of the second backup image to the expired unit remain intact.

Example Embodiments

FIG. 1 is a simplified block diagram illustrating components of an example backup system 100, in which the present disclosure can be implemented. Backup system 100 includes a network 105 that communicatively couples one or more client systems 110(1)-(N), a backup server 140, and network storage 170. Each component is discussed in further detail below.

One or more client systems 110(1)-(N), also referred to herein as client devices 110 and/or clients 110, can be implemented using, for example, a desktop computer, a laptop computer, a workstation, a server, or the like. An example of such computing devices is described subsequently, in connection with FIG. 8. One or more clients 110(1)-(N) can be configured to communicate with backup server 140 via network 105. An example of network 105, which can be used by clients 110(1)-(N) to access backup server 140, is a local area network (LAN) utilizing Ethernet, IEEE 802.11x, or some other communications protocol. While FIG. 1 illustrates client system 110(1) including client data 120 and track log 130, each client system can store different client data 120 and track log 130 in storage local to the client system.

Client data 120 can include various data that is generated and/or consumed by applications employed by a user of client system 110(1). Client data 120 can also include executable files, such as those used to implement applications and operating systems, as well as files that are used or generated by such executable files. Client data 120 can include files generated by user applications (e.g., word processing programs, email programs, graphics programs, a database application, or the like) executing on client 110(1). Some of client data 120 may also be transferred to backup server 130 via a network 105 to be included in backup storage 160 (e.g., stored as part of a backup image in backup storage 160). Each client 110 can send different client data 120 to backup server 140.

Backup server 140 is also coupled to network 105. Backup server 140 can include one or more physical servers (e.g., one or more media servers) configured to perform a variety of tasks related to management and implementation of backup services for backup system 100, such as performing a full or partial backup of a client system. In the system illustrated in FIG. 1, backup server 140 is further configured to communicate with backup storage 160 and metadata store 165 for purposes of storing backup data of client systems 110(1)-(N) in resources controlled by backup server 140 (e.g., in a storage device controlled by a media server, which are both controlled by backup server 140).

Backup storage 160 is a storage area in which backup data (e.g., backup images) can be stored. Metadata store 165 is a storage area in which metadata about backup data can be stored (e.g., a central index that includes backup image identifications, locations of backup images, lists of files included in backup images, fingerprints of files, and the like). Backup server 140 can communicate with backup storage 160 via network 105 or via a direct link between the backup server 140 and backup storage 160 (not shown).

Backup storage 160 and metadata store 165 can be stored in network storage 170. Network storage 170 can be implemented as network attached storage (NAS), file servers, storage filers, and/or network shares. Network storage 170 can be implemented as a single storage device or as a collection of storage devices. Network storage 170 can also be implemented as a storage area network (SAN), which couples remote storage devices to a server (e.g., a storage server), such that the remote storage devices appear as locally-attached storage devices to the server's OS, for example. Network storage 170 can include a data volume.

Backup services can be implemented in backup system 100 as a client-server application (not shown), with a server component (e.g., residing on backup server 140) and a client component (e.g., residing on client 110) of the client-server application. A server component can be configured to communicate with a client component during a backup process. Certain functions of the backup services can be performed by the client and server components, where the functions may be divided between the two components, or may be performed completely by one component or the other, depending on the implementation of the backup application. For example, backup server 140 can be configured to perform tasks that include communicating with clients 110 to initiate backup tasks on the clients, maintaining databases related to files and other information backed up from file systems associated with the clients, and managing or tracking resources that store backups of clients 110.

Embodiments of the present disclosure can be implemented in a snapshot backup module 150, which is configured to store backup images on backup storage 160 using snapshots, such as snapshot virtual disks. Other types of snapshots can also be used, such as file system snapshots, and/or volume snapshots. In one embodiment, each unit (e.g., virtual disk, file system, and/or volume) and each snapshot of a unit stores a single backup image. Snapshot backup module 150 can be implemented in backup server 140.

In response to receipt of a traditional full backup image (which includes a complete copy of client data) at backup server 140, snapshot backup module 150 is configured to generate a new storage unit (e.g., a virtual disk, a file system, and/or a volume) and store the traditional full backup image in the new storage unit. In response to receipt of a streamlined backup image (which includes changed client data and metadata identifying unchanged client data in a base backup image) at backup server 140, snapshot backup module 150 is configured to identify a base storage unit (e.g., virtual disk, file system, and/or volume) that includes the base backup image with which the streamlined backup image has an inclusion relationship, take a snapshot of the (identified) base storage unit (which generates or produces a snapshot, such as a snapshot virtual disk), and store the streamlined backup image on the snapshot. Snapshot backup module 150 is further configured to analyze the metadata of the streamlined backup image to identify portions of the base backup image that are not referenced by the streamlined backup image, and delete snapshot pointers from the snapshot that point to the identified portions of the base backup image on the base storage unit (e.g., virtual disk, file system, and/or volume). Snapshot backup module 150 is further discussed in reference to FIG. 2.

In light of the present disclosure, it will be appreciated that network storage 170 can be implemented by any type of computer-readable storage medium, including, but not limited to, internal or external hard disk drives (HDD), optical drives (e.g., CD-R, CD-RW, DVD-R, DVD-RW, and the like), flash memory drives (e.g., USB memory sticks and the like), tape drives, removable storage in a robot or standalone drive, and the like. Alternatively, it will also be appreciated that, in light of the present disclosure, backup system 100 and network 105 can include other components such as routers, firewalls and the like that are not germane to the discussion of the present disclosure and will not be discussed further herein. It will also be appreciated that other configurations are possible. For example, clients 110(1)-(N) can be directly coupled to backup server 140, backup storage 160, metadata store 165, and/or network storage 170, and so on.

The letter N is used to indicate a variable number of devices or components. For example, a variable number of clients are implemented in the backup system. Although the letter N is used in describing a variable number of instances of each of these different devices and components, a repeated use of the letter N does not necessarily indicate that each device and component has a same number of N instances implemented in the backup system.

Figure 2:
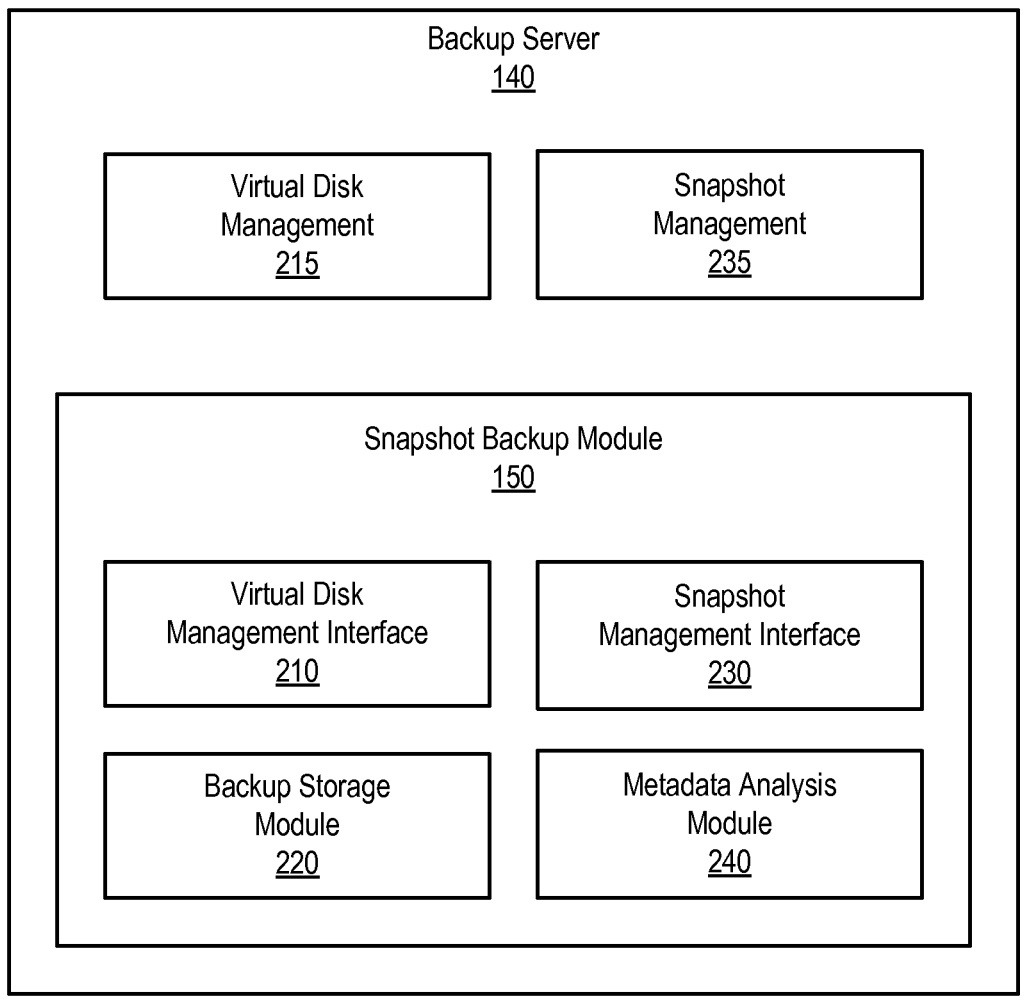
FIG. 2 is a simplified block diagram illustrating components of an example snapshot backup module, according to one embodiment.

FIG. 2 is a simplified block diagram illustrating components of a snapshot backup module 150, which can be implemented in backup server 140. Snapshot backup module 150 can include various components, such as a virtual disk management interface 210, a backup storage module 220, a snapshot management interface 230, and a metadata analysis module 240, which are further discussed below. Virtual disk management interface 210, backup storage module 220, snapshot management interface 230, and metadata analysis module 240 can be communicatively coupled to one another, and can cooperatively implement the processes of FIGS. 6 and 7, as further discussed below.

Although examples herein refer to virtual disk snapshots, other types of snapshots can be used, such as file system snapshots and volume snapshots.

In response to receipt of a backup image at backup server 140, backup storage module 220 is configured to determine whether the received backup image is a streamlined backup image or a traditional full backup image. In one embodiment, backup storage 220 is configured to determine whether the received backup image is associated with a backup image identifier (also referred to herein as a backup ID) of a base backup image. As discussed further below, each backup image can be identified using a backup ID. As discussed above, a traditional full backup image includes a complete copy of client data, while a streamlined backup image includes changed client data and metadata that identifies unchanged client data in a base backup image, which is identified by an associated backup ID. An associated backup ID can be transmitted from the client (and received by backup server 140) separately from a received streamlined backup image, or can be included in the metadata of a received streamlined backup image. In other words, a traditional full backup image does not refer to a base backup image (and thus is not associated with a backup ID of a base backup image), while a streamlined backup image refers to a base backup image (and thus is associated with a backup ID of the base backup image). Thus, if the received backup image is associated with a backup ID of a base backup image, the received backup image is determined to be a streamlined backup image (e.g., the received backup image is associated with a first backup ID that identifies the received backup image, and is also associated with a second backup ID that identifies a base backup image). If the received backup image is not associated with a backup ID of a base backup image, the received backup image is determined to be a traditional full backup image (e.g., the received backup image is associated with a first backup ID that identifies the received backup image).

Virtual disk management interface 210 is configured to communicate requests from backup storage module 220 to virtual disk management 215 of backup server 140. Virtual disk management 215 can be an off-the-shelf virtual disk generation and management mechanism that is compatible with backup server 140. A virtual disk is a virtual representation of a physical disk. A virtual disk can be stored as a single file in backup storage 160, where the file can include a complete set of contents and structure as a physical disk (e.g., other files, directory folders, and the like). In response to determining that the received backup image is a traditional full backup image, backup storage module 220 is configured to generate a new storage unit, also referred to herein as a new unit. In one embodiment, backup storage module 220 sends a request to generate a new virtual disk to virtual disk management 215 via virtual disk management interface 210, where the received backup image is stored in the new virtual disk.

In another embodiment, virtual disk management interface 210 is configured to communicate with a volume manager (not shown) compatible with backup server 140. Volume manager manages file systems and/or volumes in backup storage. A file system is responsible for organizing and managing client data by providing a structure in which client data of a client device is stored. A volume is a single accessible storage area that stores client data, where a file system can be stored within a volume. In such an embodiment, backup storage module 220 is configured to send a request to generate a new file system (e.g., one type of new storage unit) or a request to generate a new volume (e.g., another type of new storage unit) to the volume manager, via interface 210.

Snapshot management interface 230 is configured to communicate requests from backup storage module 220 (and metadata analysis module 240) to snapshot management 235 of backup server 140. Snapshot management 235 can be an off-the-shelf snapshot generation and management mechanism that is compatible with backup server 140, where snapshot management 235 is configured to generate a snapshot of a base storage unit, also referred to herein as a base unit (e.g., a virtual disk, a virtual disk snapshot, a file system, a file system snapshot, a volume, and/or a volume snapshot). In response to determining that the received backup image is a streamlined backup image (which is associated with a backup ID that identifies a base backup image), backup storage module 220 is configured to identify a base unit that stores the base backup image (identified by the backup ID), and to send a snapshot request to snapshot management 235 via snapshot management interface 230. Backup storage module 220 is configured to request that a snapshot be taken of the (identified) base unit that stores the base backup image, which produces a snapshot (e.g., a snapshot virtual disk, a snapshot file system, and/or a snapshot volume).

A snapshot is a point-in-time copy of a base unit (e.g., a virtual disk, a virtual disk snapshot, a file system, a file system snapshot, a volume, and/or a volume snapshot). In one embodiment, a snapshot virtual disk is a point-in-time copy of a base virtual disk. The snapshot does not contain a second copy of the base backup image on the base unit, but instead includes an array of pointers that reference, or point to, portions of the base backup image. The array of pointers represents a copy of the base backup image on the snapshot, which can be referenced by the streamlined backup image. Thus, backup storage space is saved by using a representation of the base backup image on the snapshot, where the representation is much smaller in size compared to a full copy of the base backup image.

Backup storage module 220 is also configured to store a backup image by writing backup data (e.g., client data and/or metadata) of the backup image to storage units (e.g., virtual disks, file systems, and/or volumes), including snapshots of storage units, in backup storage 160. A client can send the backup data to backup server 140 via a stream, such as a tar stream. A tar stream is a formatted stream of data (e.g., a stream of data formatted using the tar (Tape Archive) file format) transmitted from client 110 to another device, such as backup server 140. For example, client 110 can transmit backup data (such as client data and/or metadata) as a tar stream across network 150 to backup server 140 (also referred to herein as transmitting backup data via a tar stream) to be stored in backup storage 160. The stream can be temporarily stored at backup server 140, such as in a buffer or other temporary storage area, and is transmitted to backup storage 160, as directed by backup storage module 220.

Metadata analysis module 240 is configured to analyze metadata of a streamlined backup image to identify portions of a base backup image that are not referenced by the streamlined backup image. Metadata of the streamlined backup image describes an inclusion relationship between the base backup image and the streamlined backup by indicating which portions of the base backup image are included in the streamlined backup image. The inclusion relationship thus indicates a parent/child association between the streamlined backup image (i.e., child backup image) and the base backup image (i.e., parent backup image). A snapshot (e.g., a snapshot virtual disk, a snapshot file system, and/or a snapshot volume) includes an array of pointers that point to different portions (e.g., files, file segments, and/or other sized portion of client data) of the base backup image on a base unit. Any portions of the base backup image that are not included in the streamlined backup image (e.g., portions of the first backup image that have been overwritten or replaced by other portions of the streamlined backup image) are identified by metadata analysis module 240.

In order to save backup storage space, metadata analysis module 240 is also configured to send a removal request to snapshot management 235 via snapshot management interface 230. Since the identified portions of the base backup image are not referenced by the streamlined backup image (and thus are not needed for inclusion in the streamlined backup image), metadata analysis module 240 can request that the pointers that point to the identified portions of the base backup image be removed from the array of pointers on the snapshot.

Figure 3:
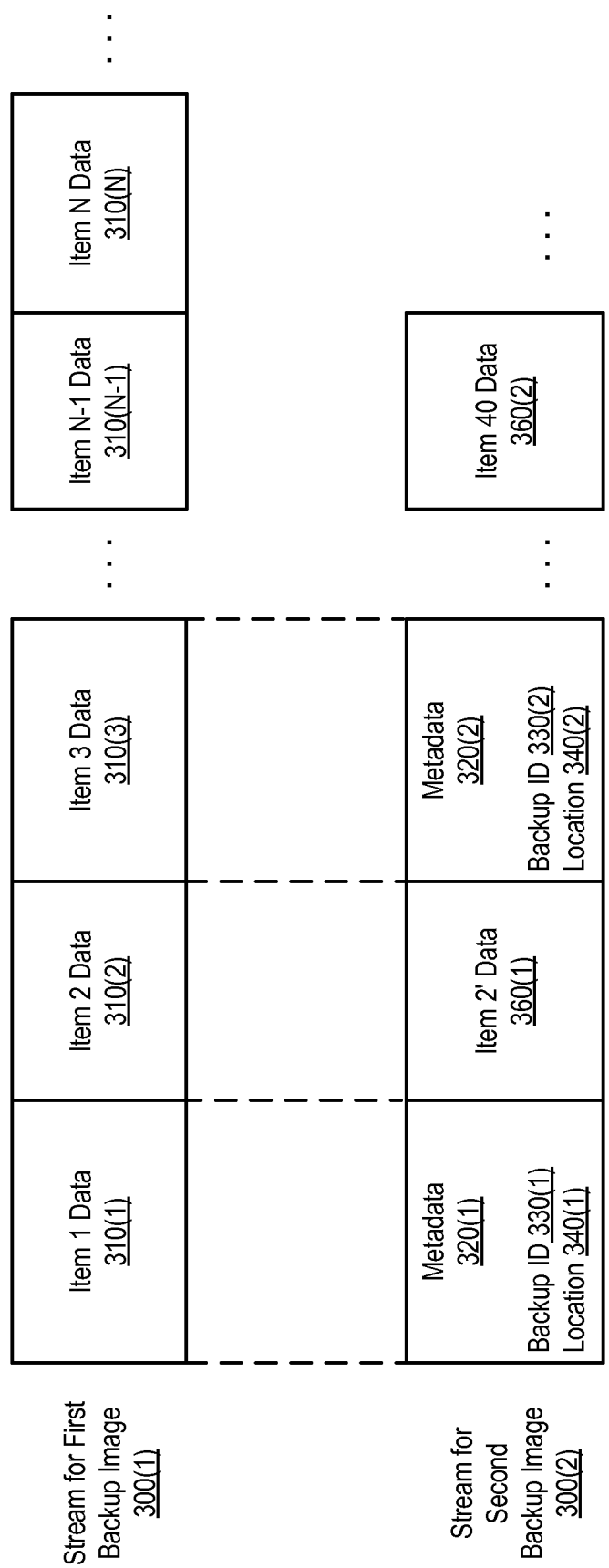
FIG. 3 is a simplified block diagram illustrating elements of example streams of transmitted data for a first backup image and for a second backup image, according to one embodiment.

FIG. 3 is a simplified block diagram illustrating elements of a first stream of transmitted data for a first backup image 300(1) and a second stream of transmitted data for a second backup image 300(2). The first and second streams 300 are transmitted from a client 110 to backup server 140, where the second stream is transmitted after the first stream. As illustrated, data 310 of data items 1-N are being transmitted via a first stream 300(1) to be included in the first backup image. Data items are portions of client data (e.g., files, file segments, and/or other sized portion of client data). The first backup image can be a traditional backup image or a streamlined backup image. The second backup image is a streamlined backup image that has an inclusion relationship with the first backup image, as will be further described below. A track log is associated with the first backup image and indicates attributes of data items 1-N of the first backup image. The track log contains attributes of the data items that are included in the first backup image, where the attributes were captured at the time the first backup image was created. Example attributes of a data item include a fingerprint of a data item, a starting block and block count of a data item, a change time associated with a data item, a modify time associated with a data item, a path name associated with a data item, and the like. In one embodiment, data 310 of each data item can be associated with a data header, which is also transmitted to backup server 140 via the first stream 300(1). The data header can inform backup server 140 that client data follows the data header.

In the embodiment illustrated, data items 1 and 3 of second stream 300(2) have not changed since the first backup image was created, data item 2 has changed since the first backup image was created, and data item 40 is new (and thus is not included in the first backup image). Client 110 can determine that the data items have or have not changed using the track log that is associated with the first backup image. By comparing a present value of an attribute of a data item to the track log value of the attribute, client 110 can determine whether the data item has changed (e.g., comparing a modify time of a data item recorded in track log to the present modify time of the data item, available in the file system of client 110). If a data item has not changed since the first backup image was created, the first backup image can be used as a base backup image from which the unchanged data item can be identified. In other words, the second backup image is a child backup image that refers to client data included as part of the first backup image, or parent backup image.

Rather than re-transmitting data for data item 1, which has not changed since the first backup image, client 110 can instead transmit metadata 320(1) that identifies data item 1 to the backup server 140 as unchanged client data. In one embodiment, if two or more data items are unchanged and are contiguous in the first backup image (e.g., data item 10 occupies blocks 30-40 and data item 11 occupies blocks 41-50 in the first backup image), client 110 can transmit metadata that identifies both data items 10 and 11 as a single group or chunk of unchanged client data. The metadata identifying the unchanged client data can be obtained from attributes of the contiguous unchanged data items 10 and 11, which are stored in the track log that is associated with the first backup image (e.g., starting block and block count of the data items). The metadata is transmitted to backup server 140 via second stream 300(2). In one embodiment, the metadata can be included in a metadata header that is transmitted to backup server 140 via second stream 300(2).

Metadata 320 can include backup ID (or backup image identifier) 330 of the backup image that contains data item 1, which in this example is the backup ID of the first backup image. Metadata 320 can also include a location 340 of the unchanged client data in the identified backup image, such as a starting block and length of the unchanged client data (e.g., a single data item or a group of contiguous data items). A starting block and length can be determined using from the track log associated with the first backup image. For example, the track log can indicate that data item 1 starts at a particular block or offset within the identified backup image, and runs for a length of blocks. In another embodiment, location 340 can include one or more file names (e.g., full path name) of the unchanged client data (e.g., in an embodiment where data items are files). Thus, metadata 320 describes an association, or inclusion relationship, between the second backup image and the first backup image, where unchanged client data of the first backup image (e.g., parent or base backup image) is referenced by the second backup image (e.g., child backup image).

Data of data item 2 has changed since the first backup image was created, which is represented by item 2' data 360(1). Client 110 can transmit item 2' data 360(1) to backup server 140 via second stream 300(2). In one embodiment, a data header can be associated with item 2' data and transmitted to backup server 140 via second stream 300(2). The data header can inform backup server 140 that (changed) client data follows the data header.

Data of data item 3 has not changed since the first backup image was created, and client 110 can transmit metadata 320(2) that identifies data item 3 to backup server 140 as unchanged client data, in a manner as discussed above.

Data of data item 40 is new client data that has been created since the first backup image was created, and is treated as changed client data. Client 110 can transmit item 40 data 360(2) to backup server 140 as changed client data, in a manner as discussed above.

FIG. 4A-4E are simplified block diagrams illustrating how backup images are stored using virtual disk snapshots. Although examples herein refer to virtual disks and virtual disk snapshots, other types of units and snapshots can be used to improve data management and reduce backup data storage, such as file systems and file system snapshots, and/or volumes and volume snapshots. As discussed further herein, a snapshot is taken of a base unit (or of another snapshot of a base unit). Snapshot pointers are similarly established between a (child) snapshot and a (parent) base unit (or another snapshot of a base unit). Any unused spaces or snapshot pointers from the snapshot to the base unit are removed, based on whether metadata of the snapshot indicates portions (e.g., files, file segments, and/or other sized portions of client data) of the base unit are included in the snapshot (as further discussed below).

Figure 4A:
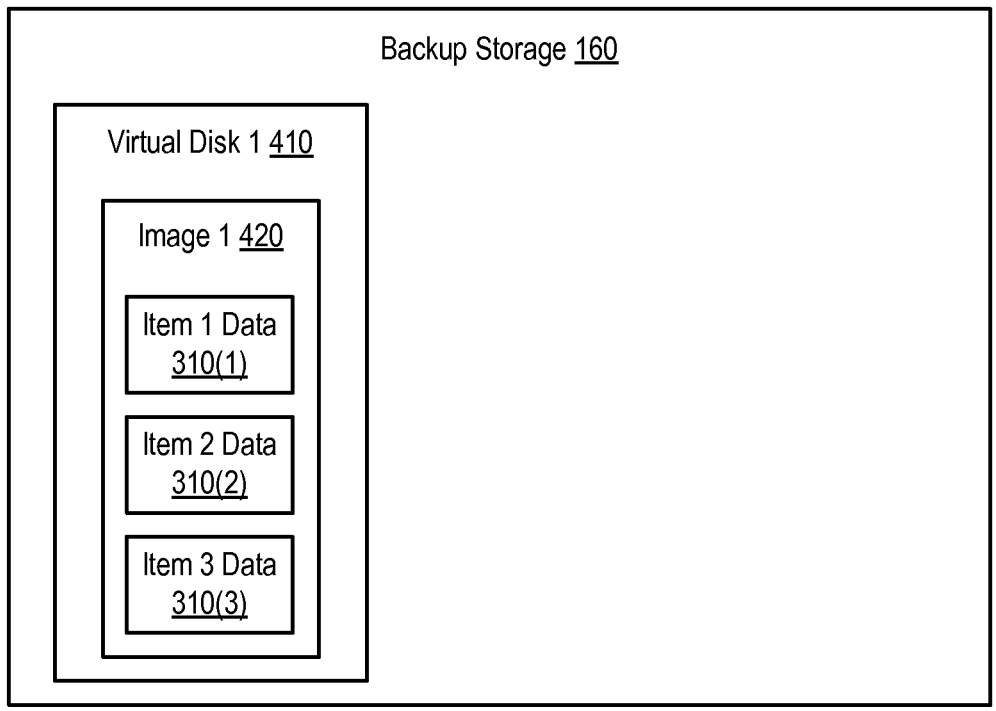
FIG. 4A-4E are simplified block diagrams illustrating how backup images are stored using virtual disk snapshots, according to one embodiment.

In FIG. 4A, snapshot backup module 150 generates virtual disk 1 410 in backup storage 160, in response to receipt of backup image 1 420 at backup server 140. Backup image 1 420 is a traditional full backup image of a client that includes a complete copy of client data, which is illustrated as data items 1-3 310 (also referred to herein as items 1-3). After virtual disk 1 is created, snapshot backup module 150 stores backup image 1 420 in virtual disk 1. In one embodiment, backup image 1 420 is stored as a single backup image file on virtual disk 1, where backup image 1 420 includes data items 1-3 310 (where the data items can be client files, file segments, and/or other sized portions of client data). In another embodiment, backup image 1 420 is parsed out and stored as backup image 1's component client files on virtual disk 1, where data items 1-3 310 are client files. In such an embodiment, files of the client data included in backup image 1 are stored in directory format on virtual disk 1, which can be the original directory format of the files on client 110 or another specified directory format.

Snapshot backup module 150 also stores a backup image identifier (backup ID) of backup image 1 (e.g., a backup ID that identifies backup image 1), an expiration time of backup image 1 (which is also the expiration time of virtual disk 1), and an identifier of virtual disk 1 in metadata store 165. Each backup image stored in backup storage is identified by a unique backup ID, where a backup ID is generated using information about the client that generated the backup image (e.g., a client name and backup image generation time) and the backup policy used to generate the backup image (e.g., a backup policy name). Other metadata about backup image 1 (e.g., additional information about the client and backup policy used to generate backup image 1) can also be stored in metadata store 165. Snapshot backup module 150 can also communicate the expiration time of virtual disk 1 to snapshot management 235 via snapshot management interface 230.

Figure 4B:
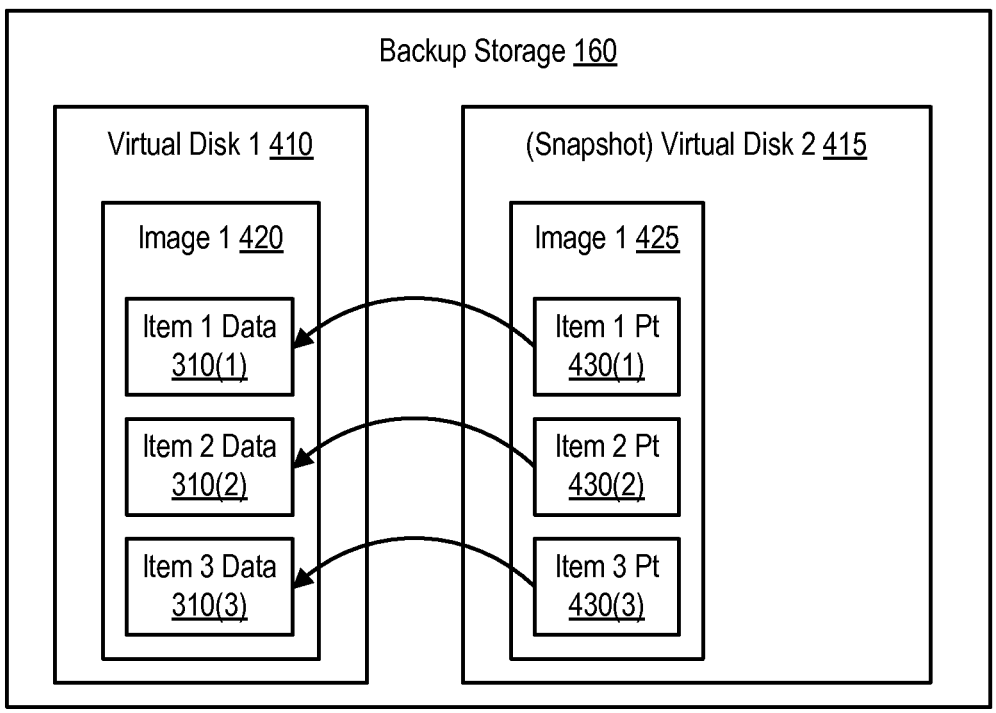

In FIG. 4B, snapshot backup module 150 generates snapshot virtual disk 2 415 in response to receipt of a streamlined backup image (not shown in FIG. 4B) at backup server 140. The streamlined backup image has an inclusion relationship with a base backup image, which is identified as backup image 1 420 stored on virtual disk 1 410. Snapshot virtual disk 2 is generated by taking a snapshot of virtual disk 1, which is identified as the base virtual disk that stores the base backup image (e.g., backup image 1). Snapshot virtual disk 2 includes an array of pointers 430 that reference, or point to, different locations in backup image 1 (e.g., locations of data items, which can be files, file segments, and/or other sized portions of client data), where each pointer in the array of pointers 430 corresponds to a location of backup image 1 420, and each location corresponds to a data item (e.g., a portion of client data). Thus, each pointer in the array of pointers 430 also corresponds to a data item included in backup image 1 420. In the embodiment illustrated, item 1 pointer 430(1) refers to (and corresponds to) item 1 data 310(1), item 2 pointer 430(2) refers to (and corresponds to) item 2 data, and item 3 pointer 430(3) refers to (and corresponds to) item 3 data 310(3). Thus, snapshot virtual disk 2 provides a point-in-time copy of backup image 1 420, where the array of pointers 430 on snapshot virtual disk 2 provides a representation 425 of backup image 1 420 (also referred to herein as backup image 1 representation 425).

Figure 4C:
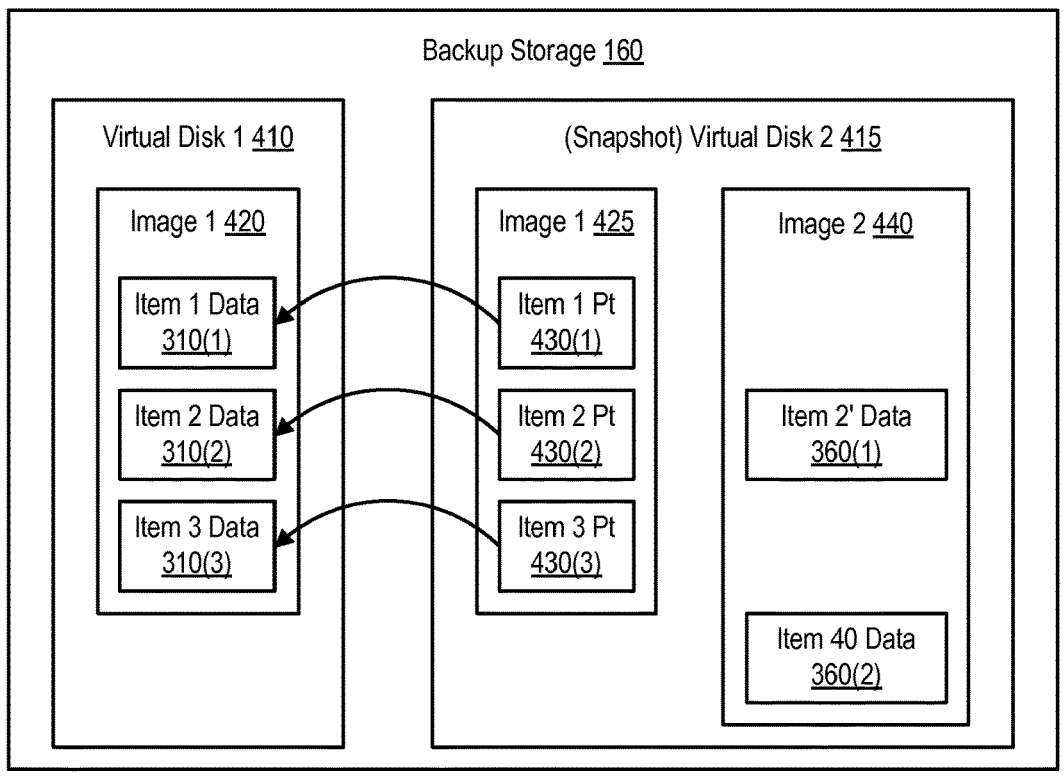

In FIG. 4C, snapshot backup module 150 stores the streamlined backup image, which is illustrated as backup image 2 440, to snapshot virtual disk 2. Backup image 2 440 includes changed client data, such as changed data item 2, which is illustrated as item 2' data 360(1). Backup image 2 440 also includes new client data not included in the base backup image (backup image 1), such as new item 40 data 360(2). In one embodiment, backup image 2 is stored as a single file on snapshot virtual disk 2, where backup image 2 includes item 2' data and item 40 data (which can be files, file segments, and/or other sized portions of client data). In another embodiment, backup image 2 is parsed out and stored as backup image 2's component client files on snapshot virtual disk 2, where item 2' data and item 40 data are files. In such an embodiment, files of the client data included in backup image 2 are stored in directory format on snapshot virtual disk 2, which can be the original directory format of the files on client 110 or another specified directory format.

Figure 4D:
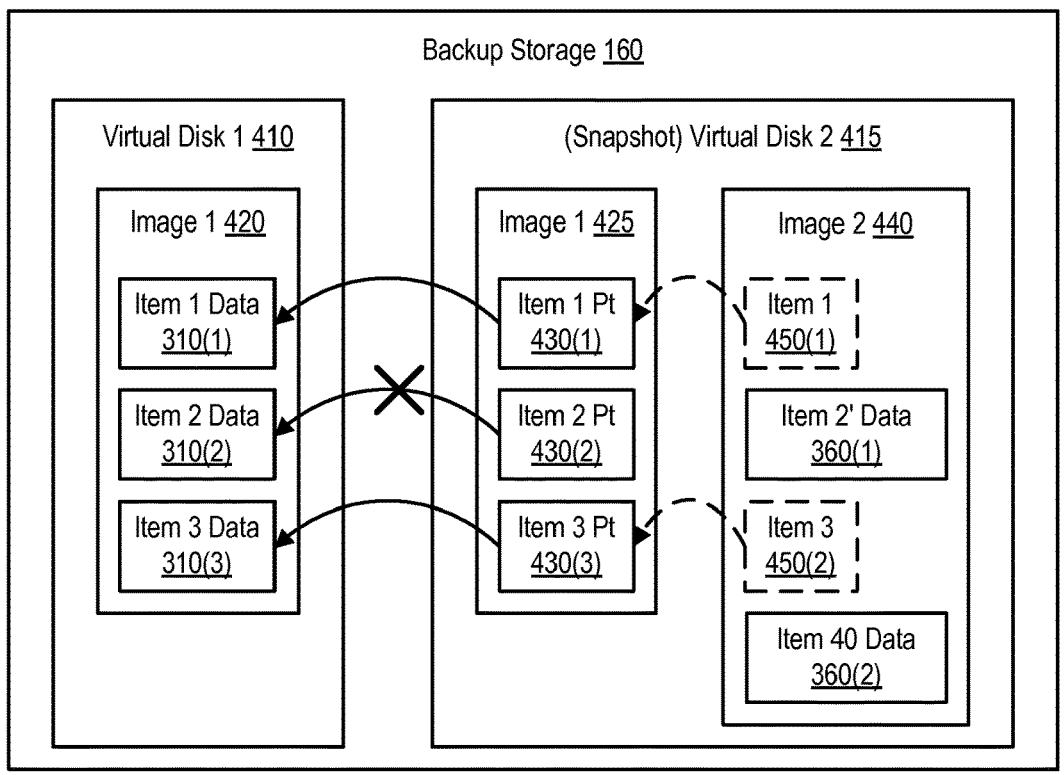

In FIG. 4D, metadata of streamlined backup image 2 describes the inclusion relationship between backup image 1 and backup image 2, where the metadata identifies one or more locations in backup image 1 that correspond to unchanged client data referred to by backup image 2. Since backup image 1 420 is represented on snapshot virtual disk 2 by the array of pointers 430 (which includes multiple pointers that each point to a different location of backup image 1 420 on virtual disk 1), each location in backup image 1 420 identified by the metadata corresponds to one or more of the pointers in the array of pointers 430. By using the array of pointers to represent backup image 1 420, unchanged client data that is included as part of backup image 1 420 on virtual disk 1 can be referenced by backup image 2 440 (and effectively included in backup image 2), without requiring the unchanged client data to be copied over to the snapshot virtual disk.

In the embodiment illustrated, the metadata of backup image 2 indicates that data item 1 is unchanged client data (which is illustrated by item 1 450(1) in a broken-lined box), and that backup image 2 refers to data item 1 of backup image 1. Since backup image 1 420 is represented as backup image 1 representation 425 on snapshot virtual disk 2, the metadata of backup image 2 can be viewed as referring to a pointer of backup image 1 representation 425 that corresponds to data item 1 of backup image 1 (which is illustrated by a broken arrow from item 1 450(1) to item 1 pointer 430(1), since item 1 pointer 430(1) corresponds to data item 1 310(1)). The metadata also indicates that data item 3 is unchanged client data (which is illustrated by item 3 450(2) in a broken-lined box) and that backup image 2 refers to a pointer of backup image 1 representation 425 that corresponds to data item 3 of backup image 1 (which is illustrated by a broken arrow from item 3 450(2) to item 3 pointer 430(3) of backup image 1 representation 425, since item 3 pointer 430(3) corresponds to data item 3 310(3)).

To save backup storage space, snapshot backup module 150 deletes unused spaces in snapshot virtual disk 2 and removes references to virtual disk 1 (e.g., the base virtual disk). Snapshot backup module 150 identifies the portions of backup image 1 that are not referenced by backup image 2 (e.g., portions or client data of backup image 1 that have been overwritten or replaced by other portions or client data of backup image 2) for removal by examining or analyzing the metadata of backup image 2. In the embodiment illustrated, metadata of backup image 2 does not indicate that data item 2 is referenced by backup image 2 (which is illustrated by a lack of a broken arrow from backup image 2 to item 2 pointer 430(2) of backup image 1 representation 425, as well as by the presence of item 2' data 360(1) that replaces item 2 data 310(2)). In response to determining that item 2 is not referenced by backup image 2, snapshot backup module 150 identifies item 2, which corresponds to pointer 430(2), for removal from snapshot virtual disk 2 (which is illustrated by the large X placed on the solid arrow from item 2 pointer 430(2) to item 2 data 310(2)).

Figure 4E:
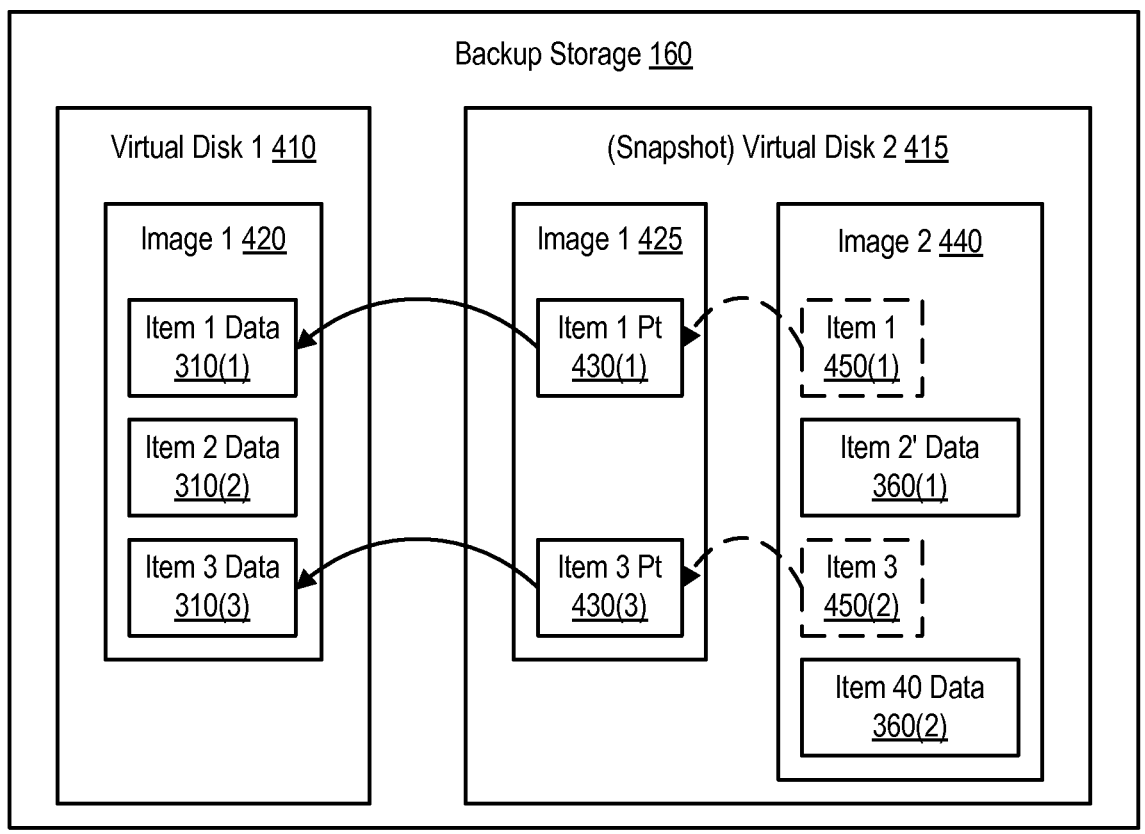

In FIG. 4E, snapshot backup module 150 removes the identified portions of backup image 1 that are not referenced by backup image 2. In the embodiment illustrated, item 2 pointer 430(2), which corresponds to identified item 2, has been removed from backup image 1 representation 425 on snapshot virtual disk 2. Although not shown in FIG. 4D, metadata that corresponds to the removed portions of the base backup image can also be removed from snapshot virtual disk 2. As also illustrated, the identified portions are not removed from the base backup image.

Snapshot backup module 150 can also store a backup image ID (identifier) of backup image 2, an expiration time of backup image 2 (which is also the expiration time of snapshot virtual disk 2), and an identifier of snapshot virtual disk 2 in metadata store 165. Other metadata about backup image 2 (e.g., information about the client and backup policy used to generate backup image 2) can also be stored in metadata store 165. Snapshot backup module 150 can also communicate the expiration time of virtual disk 2 to snapshot management 235 via snapshot management interface 230.

FIG. 5A-5D are simplified block diagrams further illustrating how backup images are stored using virtual disk snapshots. The process described in FIG. 4B-4E is performed by snapshot backup module again in FIG. 5A-5D. Although examples herein refer to virtual disks and virtual disk snapshots, other types of units and snapshots can be used to improve data management and reduce backup data storage, such as file systems and file system snapshots, and/or volumes and volume snapshots.

Figure 5A:
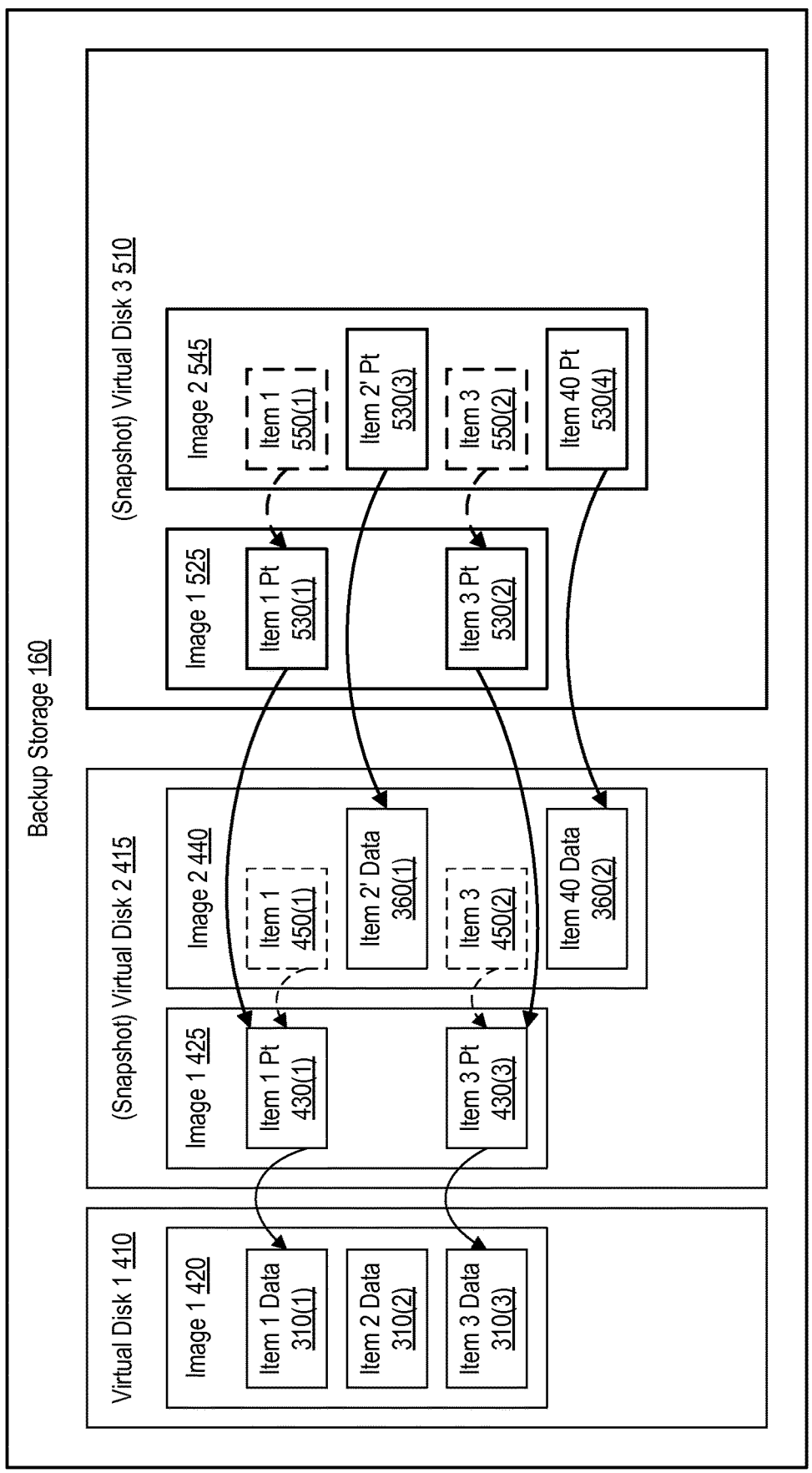
FIG. 5A-5D are simplified block diagrams illustrating how backup images are stored using virtual disk snapshots, according to one embodiment.

In FIG. 5A, snapshot backup module 150 generates snapshot virtual disk 3 510 in backup storage 160, in response to receipt of a second streamlined backup image (not shown in FIG. 5A) at backup server 140. The second streamlined backup image has an inclusion relationship with a base backup image, which is identified as backup image 2 stored in snapshot virtual disk 2 415 (also referred to herein as virtual disk 2).

Snapshot virtual disk 3 is generated by taking a snapshot of virtual disk 2, which is identified as the base virtual disk that stores the base backup image (e.g., backup image 2). The metadata of the second streamlined backup image that describes the inclusion relationship between the second streamlined backup image and backup image 2 will refer to unchanged client data in backup image 2 on virtual disk 2. Although the base backup image is identified as backup image 2 440, backup image 2 also has an inclusion relationship with backup image 1 and refers to unchanged client data of backup image 1. The references from backup image 2 to backup image 1 are needed to "translate" the location described in the metadata of the second streaming backup image into a location of backup image 1 420, which corresponds to the unchanged client data. Thus, the base backup image can be viewed as the combination of backup image 1 representation 425 (which is the representation of backup image 1 420 stored on virtual disk 1) and backup image 2 440 (which includes changed client data and metadata identifying unchanged client data located in backup image 1 420) stored on virtual disk 2.

Snapshot virtual disk 3 includes an array of pointers 530 that reference, or point to, different locations in the base backup image (e.g., locations of data items, which can be files, file segments, and/or other sized portions of client data), and thus provides a point-in-time copy of the base backup image stored on virtual disk 2 (e.g., initial backup image 1 representation 425 and backup image 2 440). The array of pointers 530 provides a representation of the base backup image on snapshot virtual disk 3, which is the combination of (subsequent) backup image 1 representation 525 and backup image 2 representation 545. Each pointer in array of pointers 530 corresponds to a location of (initial) backup image 1 representation 425 or backup image 2 440, where each location corresponds to a data item (e.g., a portion of client data). In the embodiment illustrated, item 2' pointer 530 (3) refers to (and corresponds to) item 2' data 360(1) of backup image 2 440 and item 40 pointer 530(4) refers to (and corresponds to) item 40 data 360(2) of backup image 2 440.

Since backup image 1 representation 425 is also an array of pointers, some of pointers 530 will reference, or point to, pointers 430 of backup image 1 representation 425 on virtual disk 2. In the embodiment illustrated, item 1 pointer 530(1) refers to item 1 pointer 430(1), and item 3 pointer 530(2) refers to item 3 pointer 430(3). Since item 1 pointer 430(1) corresponds to data item 1 310(1), item 1 pointer 530(1) also corresponds to data item 1 310(1). Similarly, since item 3 pointer 430(3) corresponds to data item 3 310(3), item 3 pointer 530(2) also corresponds to item 3 310(3). Thus, each pointer in the array of pointers 530 also corresponds to a data item of the base backup image. By using the array of pointers to represent base backup image, unchanged client data that is included as part of backup image 2 440 on virtual disk 2 (and backup image 1 420 on virtual disk 1) can be referenced by backup image 3 560 (and effectively included in backup image 3), without requiring the unchanged client data to be copied over to snapshot virtual disk 3.

Figure 5B:
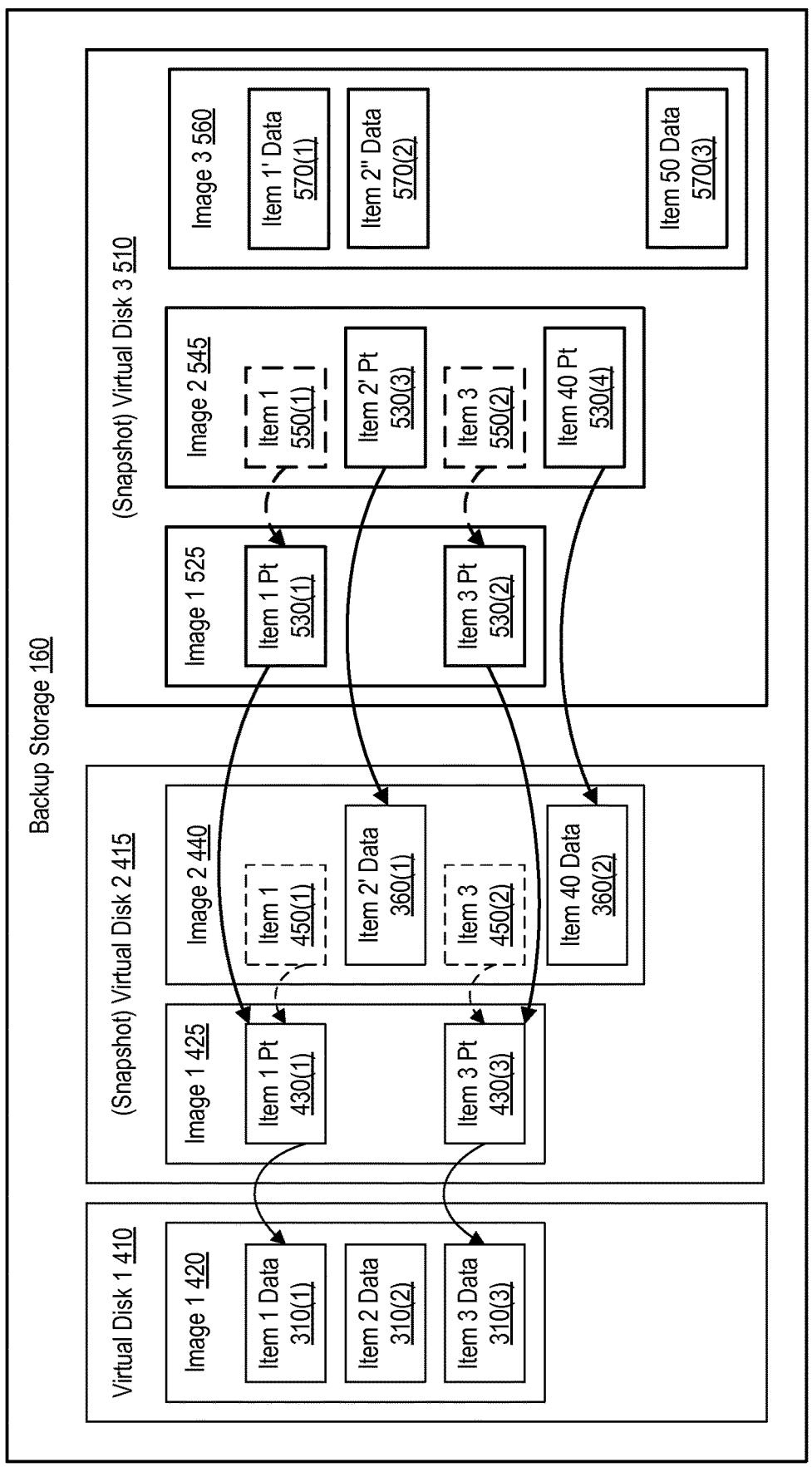

In FIG. 5B, snapshot backup module 150 store the second streamlined backup image, which is illustrated as backup image 3 560, to snapshot virtual disk 3. Backup image 3 560 includes changed client data, such as changed data items 1 and 2, which are illustrated as item 1' data 570(1) and item 2" data 570(2). Backup image 3 560 also includes new client data not included in the base backup image, such as new item 50 data 570(3). In one embodiment, backup image 3 is stored as a single file on snapshot virtual disk 3, where backup image 3 includes item 1' data, item 2" data, and item 50 data (which can be files, file segments, and/or other sized portions of client data). In another embodiment, backup image 3 is parsed out and stored as backup image 3's component client files on snapshot virtual disk 3, where item 1' data, item 2" data, and item 50 data are files. In such an embodiment, files of the client data included in backup image 3 are stored in directory format on snapshot virtual disk 3, which can be the original directory format of the files on client 110 or another specified directory format.

Figure 5C:
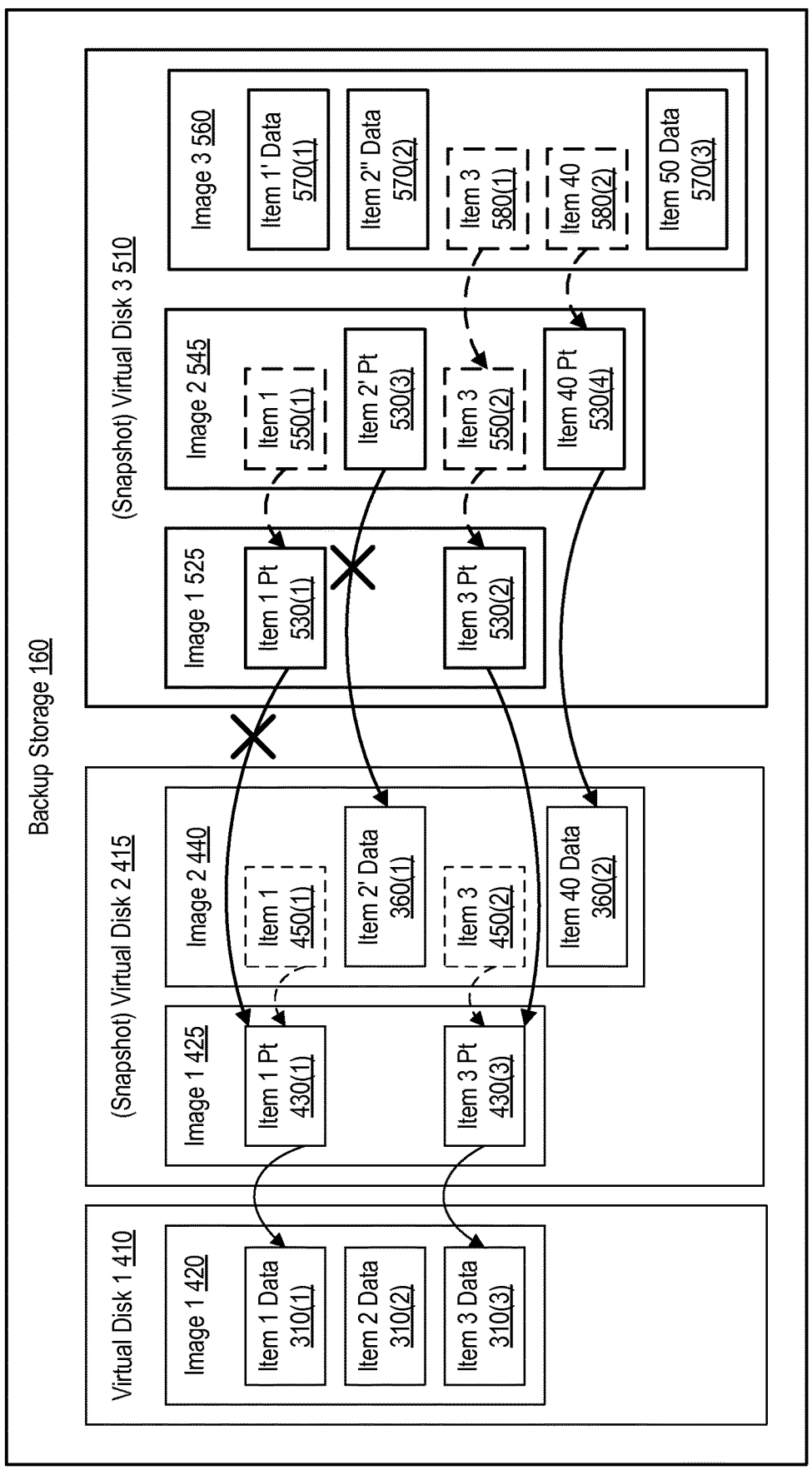

In FIG. 5C, metadata of streamlined backup image 3 describes the inclusion relationship between backup image 3 and the base backup image, where the metadata identifies one or more locations in the base backup image that correspond to unchanged client data referred to by backup image 3. Since the base backup image is represented on snapshot virtual disk 3 by array of pointers 530 (which includes multiple pointers that each point to a different location of backup image 2 440 and backup image 1 representation 425 on virtual disk 2), each location in backup image 2 440 identified by the metadata of backup image 3 corresponds to one or more of the pointers in the array of pointers 530.

In the embodiment illustrated, the metadata of backup image 3 indicates that data item 40 is unchanged client data (which is illustrated by item 40 580(2) in a broken-lined box), and that backup image 3 refers to data item 40 of backup image 2. Since backup image 2 440 is represented as backup image 2 representation 545 on snapshot virtual disk 3, the metadata of backup image 3 can be viewed as referring to a pointer of backup image 2 representation 545 that corresponds to item 40 data (which is illustrated by a broken arrow from item 40 580(2) to item 40 pointer 530(4), since item 40 pointer 530(4) corresponds to data item 40 360(2)).

The metadata of backup image 3 also indicates that data item 3 is unchanged client data (which is illustrated by item 3 580(1) in a broken-lined box) and that backup image 3 refers to data item 3 in backup image 2. Since metadata of backup image 2 indicates that backup image 2 refers to data item 3 of backup image 1 (which is illustrated as item 3 550(2) in a broken-lined box with a broken arrow to item 3 pointer 530(2) that corresponds to data item 3 310(3)), the metadata of backup image 3 can be viewed together as referring to a metadata reference of backup image 2 representation 545 that corresponds to item 3 data (which is illustrated as item 3 580(1) in a broken-lined box with a broken arrow to item 3 550(2) in a broken-lined box).

To save backup storage space, snapshot backup module 150 deletes unused spaces in snapshot virtual disk 3 and removes references to virtual disk 2 (e.g., the base virtual disk). Snapshot backup module 150 identifies the portions of the base backup image that are not referenced by backup image 3 (e.g., portions of client data of backup image 2 that have been overwritten or replaced by other portions or client data of backup image 3) for removal by examining or analyzing the metadata of backup image 3. In the embodiment illustrated, metadata of backup image 3 does not indicate that data item 1 is referenced by backup image 3 (which is illustrated by a lack of a broken arrow from backup image 3 to item 1 metadata reference 550(1) of backup image 2 representation 545, as well as by the presence of item 1' data 570(1) that replaces item 1 data 310(1)). In response to determining that item 1 is not referenced by backup image 3, snapshot backup module 150 identifies item 1, which corresponds to metadata reference 550(1) and item 1 pointer 530(1), for removal from snapshot virtual disk 3 (which is illustrated by the large X placed on the solid arrow from item 1 pointer 530(1) to virtual disk 2). Similarly, snapshot backup module 150 identifies item 2 for removal from snapshot virtual disk 3 (which is illustrated by the large X placed on the solid arrow from item 2' pointer 530(3) to virtual disk 2), since metadata of backup image 3 does not indicate that data item 3 is referenced by backup image 3 (which is illustrated by a lack of a broken arrow from backup image 3 to item 2 pointer 530(3) of backup image 2 representation 545, as well as by the presence of item 2" data 570(2) that replaces item 2 data 310(2)).

Figure 5D:
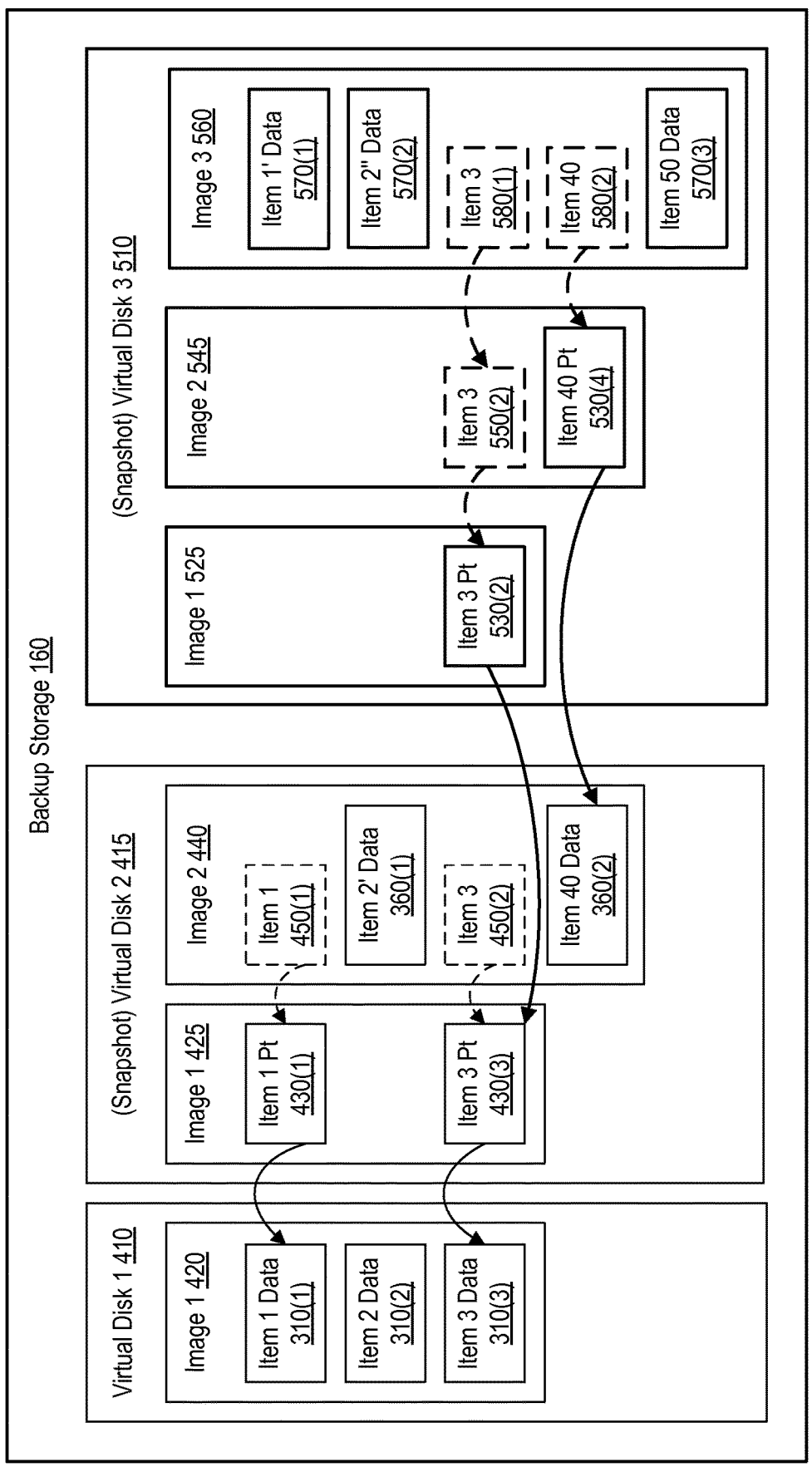

In FIG. 5D, snapshot backup module 150 removes the identified portions of backup image 2 that are not referenced by backup image 3, without removing the identified portions from the base backup image (e.g., virtual disk 2). In the embodiment illustrated, item 1 pointer 530(1), which corresponds to identified item 1, has been removed from backup image 1 representation 525 on snapshot virtual disk 3 (e.g., removed from array of pointers 530). Similarly, item 2' pointer 530(3) has been removed from backup image 2 representation 545 on snapshot virtual disk 3 (e.g., removed from array of pointers 530). Also, metadata that corresponds to the identified portions of the base backup image are removed from snapshot virtual disk 3. In the embodiment illustrated, item 1 metadata reference 550(1) has been deleted from the metadata of backup image 2 representation 545. Once the identified portions have been removed from snapshot virtual disk 3 (e.g., pointers and metadata), the resulting snapshot virtual disk 3 includes all necessary metadata references and pointers (e.g., without extraneous metadata references and pointers) that correspond to client data stored in backup storage 160 needed for restoration of backup image 3.

When a backup image expires, the virtual disk storing the expired backup image also expires. In one embodiment, the portions of the backup image that are referenced by a second backup image can be copied over to a (successive) snapshot virtual disk that stores the second backup image, and the expired virtual disk and any snapshot pointers of the snapshot virtual disk that refer to the expired virtual disk are deleted.

In such an embodiment, expiration of backup image 1 420 of FIG. 5D would result in item 1 data 310(1) being copied over to virtual disk 2 and replacing item 1 pointer 430(1) (e.g., item 1 pointer 430(1) would be deleted from array of pointers 430). Similarly, item 3 data 310(3) would be copied over to virtual disk 2, where item 3 pointer 430(3) is also deleted. Item 2 data 310(2) would not need to be copied over to virtual disk 2, since backup image 2 440 does not refer to item 2. Virtual disk 1 can then be deleted from backup storage 160 during a garbage collection process.

In another embodiment, the portions of the backup image that are referenced by a second backup image are maintained in the expired virtual disk for use by the second backup image, while the remaining portions of the backup image (which are not referenced by another backup image) are deleted from the expired virtual disk. In such an embodiment, the snapshot pointers remain intact.

In such an embodiment, expiration of backup image 1 420 of FIG. 5D would result in item 1 data 310(1) being maintained on virtual disk 1, since backup image 2 440 refers to item 1. Similarly, item 3 data 310(3) would be maintained on virtual disk 1, since backup image 2 440 also refers to item 3. Item 2 data 310(2) would be deleted from virtual disk 1, since backup image 2 440 does not refer to item 2. Virtual disk 1 would be indicated as expired, but would not be deleted from backup storage 160, as long as virtual disk 1 contained data items that were referred to by a successive snapshot virtual disk. However, maintaining an expired virtual disk may reduce restoration efficiency if the expired virtual disk contained a trivial or dwindling number of data items, where restoration efficiency can be improved by moving such data items into a successive snapshot virtual disk.

Figure 6:
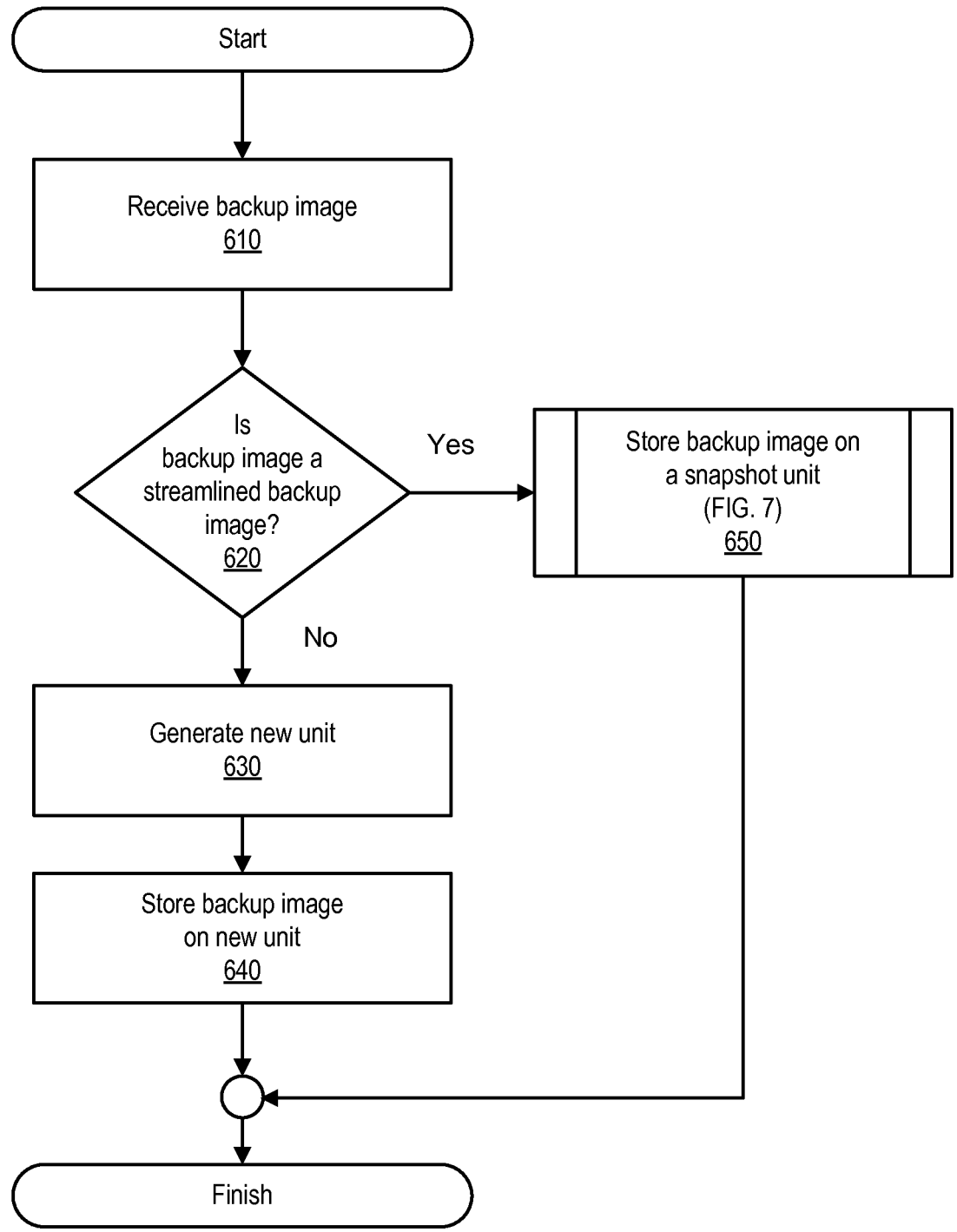
FIG. 6 is a flowchart illustrating an example backup process implemented by a snapshot backup module, according to one embodiment.

FIG. 6 is a flowchart illustrating a backup process implemented by a snapshot backup module (e.g., cooperatively implemented by virtual disk management interface 210 and backup storage module 220 of snapshot backup module 150). The process of FIG. 6 can be repeated each time a backup image needs to be stored in backup storage. Additionally, the algorithm illustrated in FIG. 6 need not be limited to a virtual disk snapshot context, but can also use file system snapshots and/or volume snapshots.

The process begins at operation 610, where backup server 140 receives a backup image of a client. The backup image can be transmitted from client 110 to backup server 140 via a stream (e.g., a tar stream) across network 105. Data of the stream is received via a port of backup server 140 and stored in a buffer or temporary memory of backup server 140. A notification of receipt of the backup image can be sent to backup storage module 220. Backup server 140 can receive either a traditional backup image, which includes a full copy of client data, or a streamlined backup image, which includes changed client data and metadata identifying unchanged client data in a previous (or base) backup image.

The process continues to operation 620, where backup storage module 220 determines whether the backup image is a streamlined backup image. The received backup image can be either a traditional backup image or a streamlined backup image. Thus, if the received backup image is determined to be a streamlined backup image, the received backup image is not determined to be a traditional backup image. Similarly, if the received backup image is not determined to be a streamlined backup image, the received backup image is determined to be a traditional backup image.

In one embodiment, backup storage module 220 determines whether the received backup image is a streamlined backup image by determining whether the received backup image is associated with a backup ID that identifies a base backup image. The associated backup ID that identifies a base backup image can be transmitted from the client (and received by backup server 140) separately from the received backup image, or can be included in metadata of the received (streamlined) backup image. If the received backup image is associated with a backup ID of a base backup image, the received backup image is also associated with the base backup image identified by the associated backup ID, which indicates that the received backup image is a streamlined backup image. Thus, if the received backup image is associated with a backup ID that identifies a base backup image, the received backup image is determined to be a streamlined backup image (e.g., the received backup image is associated with a first backup ID that identifies the received backup image, and is also associated with a second backup ID that identifies a base backup image).

Figure 7:
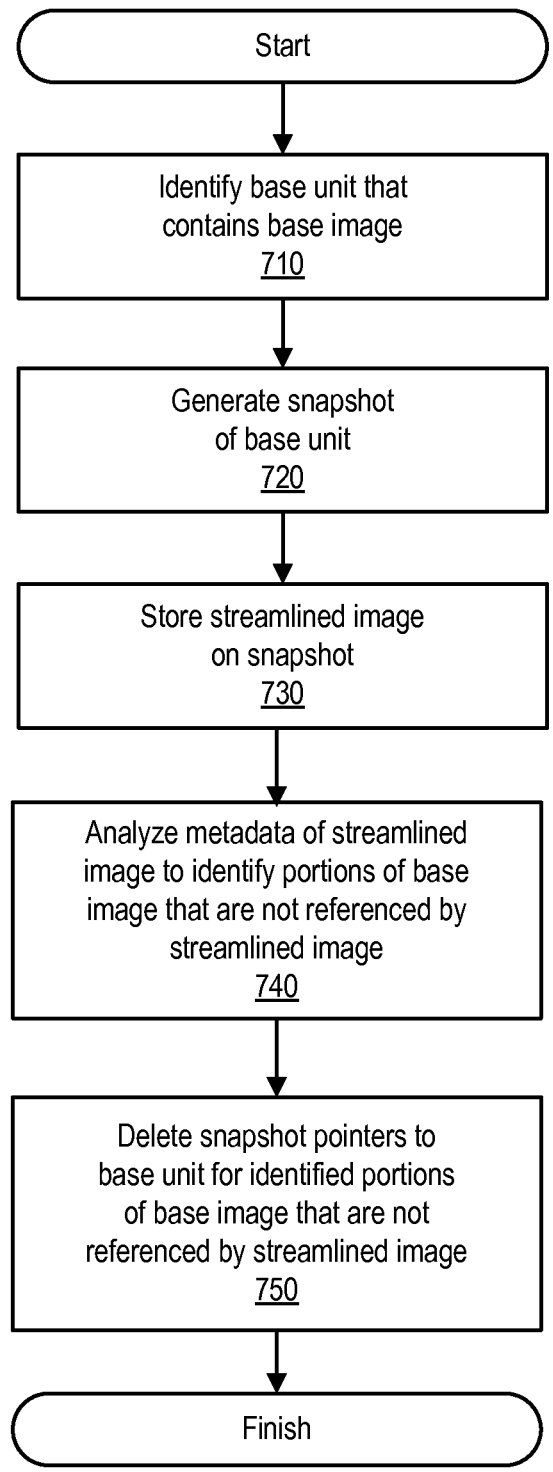
FIG. 7 is a flowchart illustrating an example snapshot backup process implemented by a snapshot backup module, according to one embodiment.

If the backup image is determined to be a streamlined backup image, the process continues to operation 650, where backup storage module 220 stores the backup image on a snapshot unit (e.g., a snapshot virtual disk, a snapshot file system, and/or a snapshot volume), further illustrated in FIG. 7. The process then ends.

Returning to operation 620, if the backup image is not determined to be a streamlined backup image (and thus the backup image is determined to be a traditional backup image), the process continues to operation 630, where backup storage module 220 creates a new unit (e.g., a virtual disk, a file system, and/or a volume). In one embodiment, backup storage module 220 is configured to communicate with virtual disk management 215 of backup server 140 via virtual disk management interface 210. Backup storage module 220 sends a request for creation of a new virtual disk to virtual disk management 215 via virtual disk management interface 210. The new virtual disk can be created on network storage that is designated as backup storage. In other embodiments, a new file system and/or a new volume is generated in operation 630, where backup storage module 220 sends a request for creation of a new file system and/or a new volume to a volume manager via interface 210, where the new file system or new volume is created on network storage that is designated as backup storage.

The process continues to operation 640, where backup storage module 220 stores the backup image as a file on the new unit (e.g., the virtual disk, the file system, and/or the volume). Backup storage module 220 also stores metadata about the new unit (e.g., an identifier of the new unit, a backup ID of the backup image stored on the new unit, and an expiration time associated with the backup image) in metadata store 165. Thus, backup server 140 can perform data management of the new unit in a manner similar to data management of backup images, such as performing clean up operations (e.g., garbage collection or removal of the unit) upon expiration of the backup image stored in the unit. The process then ends.

FIG. 7 is a flowchart illustrating a snapshot backup process implemented by a snapshot backup module (e.g., cooperatively implemented by backup storage module 220, snapshot management interface 230, and metadata analysis module 240 of snapshot backup module 150). The process of FIG. 7 can be repeated each time a streamlined backup image needs to be stored in backup storage. Additionally, the algorithm illustrated in FIG. 7 need not be limited to a virtual disk snapshot context, but can also use file system snapshots and/or volume snapshots.

The process begins at operation 710, where backup storage module 220 identifies a base unit (e.g., a virtual disk, a file system, and/or a volume) that contains a base backup image of a client. In one embodiment, a backup ID is associated with the (received) streamlined backup image, where the backup ID identifies a base backup image for the streamlined backup image (received during the process of FIG. 6). A lookup for the backup ID in metadata store 165 returns an identifier of the base unit, where the base backup image is stored on the base unit. The base unit of operation 710 can be a new unit created during the process of FIG. 6, or can be another snapshot created during a previous iteration of the process of FIG. 7.

Once the base unit is identified, the process continues to operation 720, where backup storage module 220 generates a snapshot of the base unit. Backup storage module 220 is configured to communicate with snapshot management 235 of backup server 140 via snapshot management interface 230. Backup storage module 220 sends a request to generate a snapshot of the base unit to snapshot management 235, which produces a snapshot (e.g., a second unit that is distinct from the base unit). The snapshot includes an array of pointers that reference, or point to, data of the base unit (e.g., base backup image). Thus, the snapshot provides a point-in-time copy of the base backup image on the base unit, where the array of pointers is a representation of the base backup image on the snapshot. By using the array of pointers to represent the backup image, unchanged client data that is included as part of the base backup image on the base unit can be included in the streamlined backup image, without requiring the unchanged client data to be copied over to the snapshot.

The process continues to operation 730, where backup storage module 220 stores the streamlined backup image of the client as a file on the snapshot. The streamlined backup image includes client data that has changed since the base backup image was created (e.g., since a creation time of the base backup image). The streamlined backup image also includes metadata that identifies unchanged client data (e.g., client data that has not changed since the base backup image was created) in the base backup image.

The process continues to operation 740, where metadata analysis module 240 analyzes the metadata of the streamlined backup image to identify portions of the base backup image that are not referenced by the streamlined backup image. The metadata of the streamlined backup image identifies portions of client data in the base backup image that are included in the streamlined backup image, thus indicating that those portions of the base backup image are referenced by the streamlined backup image. Any portions of the base backup image that are not referenced by the streamlined backup image (e.g., portions of the base backup image that are overwritten or replaced by other portions of the streamlined backup image) are identified for removal from the snapshot, but the identified portions are not removed from the base backup image.

Once the portions are identified, the process continues to operation 750, where metadata analysis module 240 deletes snapshot pointers to the base unit for the identified portions of the base backup image that are not referenced by the streamlined backup image. Metadata analysis module 240 is configured to communicate with snapshot management 235 via snapshot management interface 230. Metadata analysis module 240 sends one or more requests to snapshot management 235 to delete or remove one or more snapshot pointers from the array of pointers on the snapshot (which represents the base backup image), where the one or more snapshot pointers refer to, or point to, the identified portions of the base backup image on the base unit. Thus, after removal of the snapshot pointers, the snapshot includes the streamlined backup image, which includes changed (and new) client data and metadata identifying unchanged client data in the base backup image, and pointers to the unchanged client data of the base backup image that is included in the streamlined backup image. The process then ends.

Figure 8:
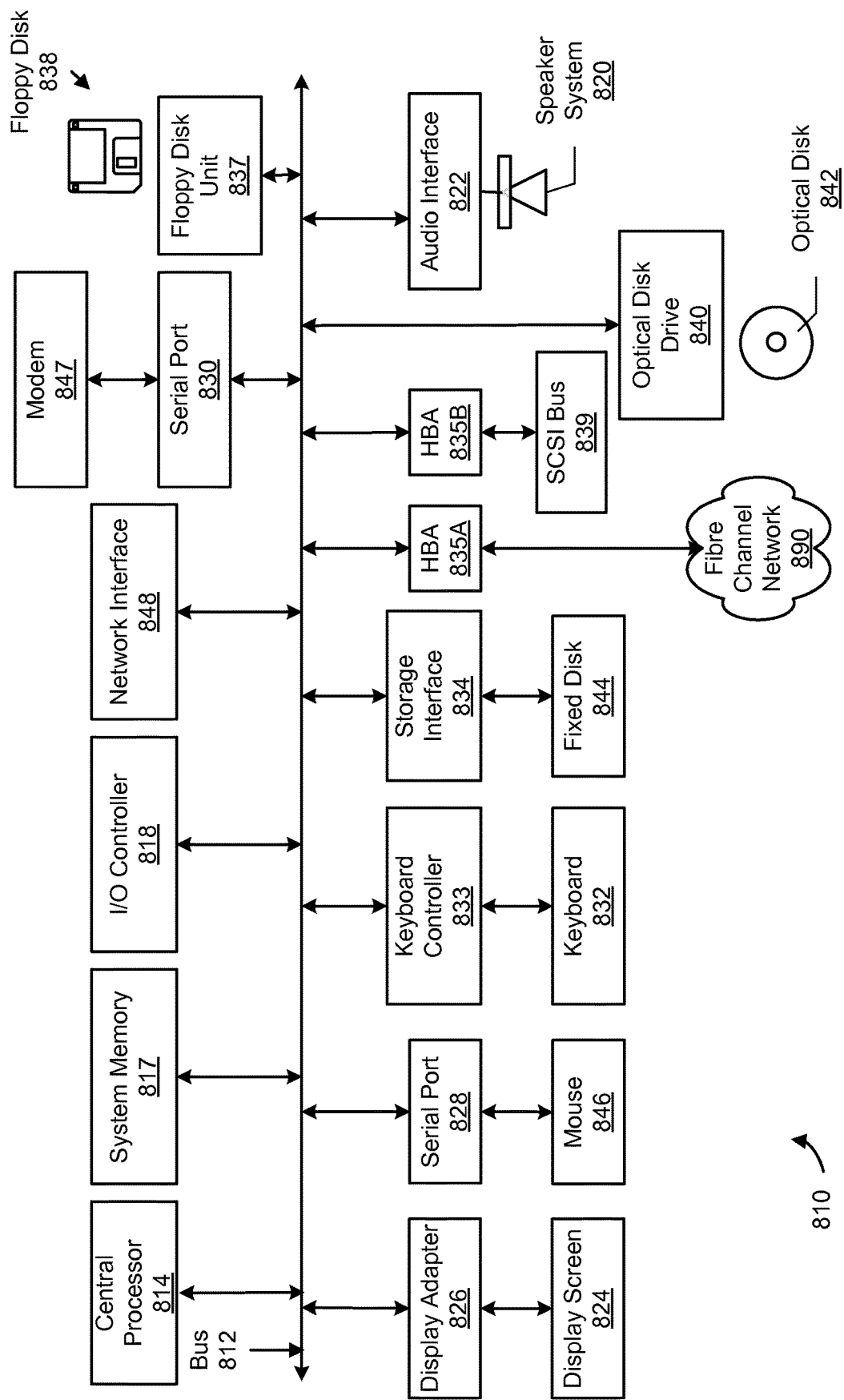
FIG. 8 is a simplified block diagram illustrating components of an example computer system suitable for implementing embodiments of the present disclosure, according to one embodiment.

FIG. 8 is a simplified block diagram that illustrates components of an example computer system 810 that is suitable for implementing the present disclosure. Computer system 810 may be illustrative of various computer systems in the backup system 100, such as system(s) 110, 130, and/or 140, among others. Computer system 810 includes a bus 812 which interconnects major subsystems of computer system 810, such as a central processor 814, a system memory 817 (typically RAM, but which may also include ROM, flash RAM, or the like), an input/output controller 818, an external audio device, such as a speaker system 820 via an audio output interface 822, an external device, such as a display screen 824 via display adapter 826, serial ports 828 and 830, a keyboard 832 (interfaced with a keyboard controller 833), a storage interface 834, a floppy disk drive 837 operative to receive a floppy disk 838, a host bus adapter (HBA) interface card 835A operative to connect with a Fibre Channel network 890, a host bus adapter (HBA) interface card 835B operative to connect to a SCSI bus 839, and an optical disk drive 840 operative to receive an optical disk 842. Also included are a mouse 846 (or other point-and-click device, coupled to bus 812 via serial port 828), a modem 847 (coupled to bus 812 via serial port 830), and a network interface 848 (coupled directly to bus 812).

Bus 812 allows data communication between central processor 814 and system memory 817, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 810 are generally stored on and accessed via a computer readable medium, such as a hard disk drive (e.g., fixed disk 844), an optical drive (e.g., optical drive 840), a floppy disk unit 837, or other storage medium. Additionally, applications can be in the form of electronic signals modulated in accordance with the application and data communication technology when accessed via network modem 847 or interface 848.

Storage interface 834, as with the other storage interfaces of computer system 810, can connect to a standard computer readable medium for storage and/or retrieval of information, such as a fixed disk drive 844. Fixed disk drive 844 may be a part of computer system 810 or may be separate and accessed through other interface systems. Modem 847 may provide a direct connection to a remote server via a telephone link or to the Internet via an internet service provider (ISP). Network interface 848 may provide a direct connection to a remote server via a direct network link to the Internet via a POP (point of presence). Network interface 848 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 8 need not be present to practice the present disclosure. The devices and subsystems can be interconnected in different ways from that shown in FIG. 8. Code for the automatically performing operations on such applications based on their dependencies on other applications (such as described above with reference to the process of FIG. 6-7), etc., to implement the present disclosure can be stored in computer-readable storage media such as one or more of system memory 817, fixed disk 844, optical disk 842, or floppy disk 838. Memory 817 is also used for storing temporary variables or other intermediate information during the execution of instructions by the processor 814. The operating system provided on computer system 810 may be MS-DOS®, MS-WINDOWS®, OS/2®, UNIX®, Linux®, or another known operating system.

Moreover, regarding the signals described herein, it will be understood that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 9:
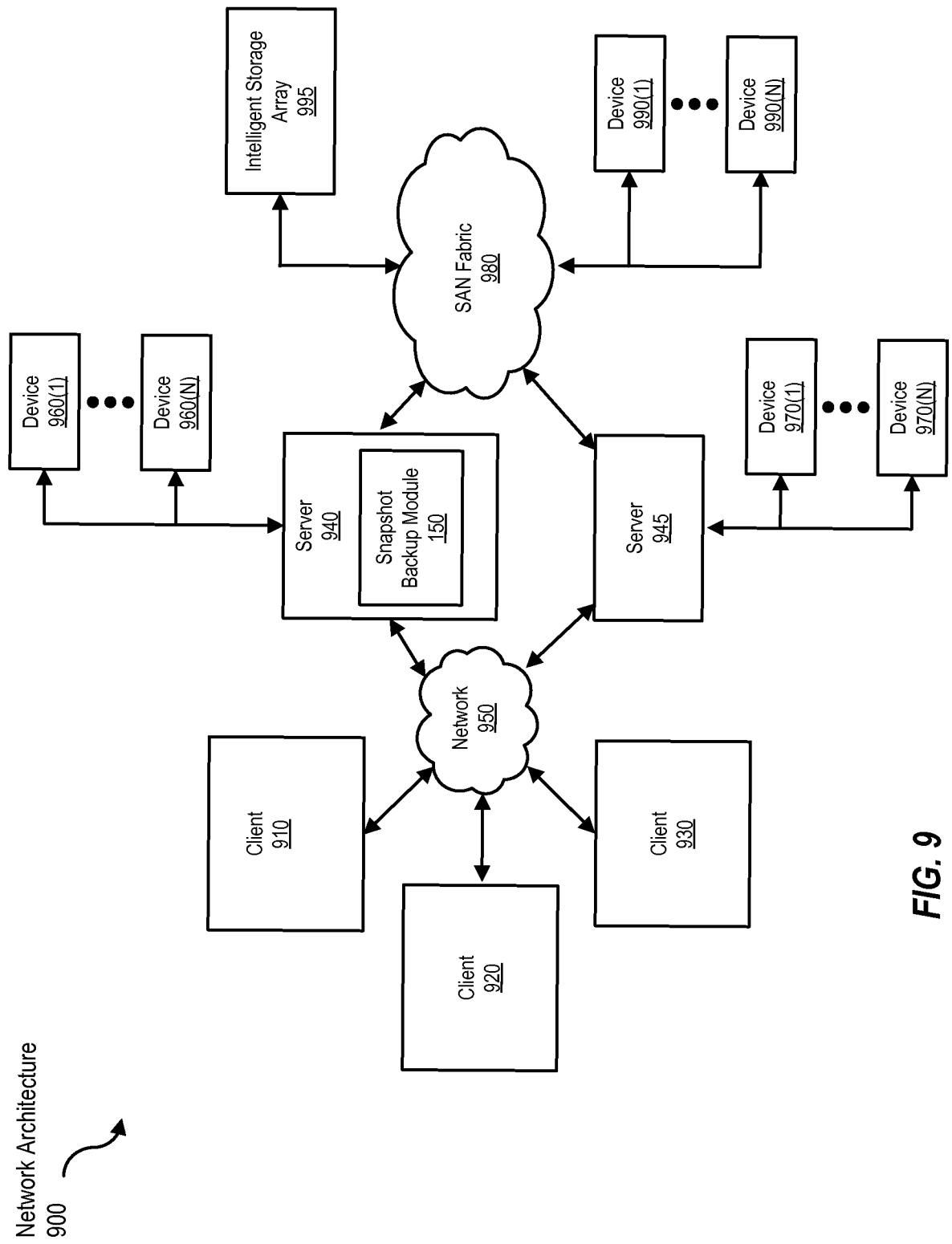
FIG. 9 is a simplified block diagram illustrating components of an example computer system suitable for implementing embodiments of the present disclosure, according to one embodiment.

FIG. 9 is a simplified block diagram illustrating components of an example computer system suitable for implementing embodiments of the present disclosure. FIG. 9 illustrates a network system 900 in which client systems 910, 920 and 930 and servers 940, and 945 can be coupled to a network 950. Client systems 910, 920 and 930 generally represent any type or form of computing device or system, such as client systems 110 in FIG. 1 or computer system 810 in FIG. 8.

Similarly, servers 940 and 945 generally represent computing devices or systems, such as application servers or database servers, configured to provide various database services and/or run certain software applications, such as backup server 140 in FIG. 1 or computer system 810 in FIG. 8. Network 950 generally represents any telecommunication or computer network including, for example, an intranet, a wide area network (WAN), a local area network (LAN), a personal area network (PAN), or the Internet. In one example, servers 940 and/or 945 can include a snapshot backup module 150, as shown in FIGS. 1 and 2.

As illustrated in FIG. 9, one or more storage devices 960(1)-(N) can be directly attached to server 940. Similarly, one or more storage devices 970(1)-(N) can be directly attached to server 945. Storage devices 960(1)-(N) and storage devices 970(1)-(N) generally represent any type or form of storage device or medium capable of storing data and/or other computer-readable instructions. In certain embodiments, storage devices 960(1)-(N) and storage devices 970(1)-(N) can represent network-attached storage (NAS) devices configured to communicate with servers 940 and 945 using various protocols, such as Network File System (NFS), Server Message Block (SMB), or Common Internet File System (CIFS).

Servers 940 and 945 can also be connected to a storage area network (SAN) fabric 980. SAN fabric 980 generally represents any type or form of computer network or architecture capable of facilitating communication between multiple storage devices. SAN fabric 980 can facilitate communication between servers 940 and 945 and a plurality of storage devices 990(1)-(N) and/or an intelligent storage array 995. SAN fabric 980 can also facilitate, via network 950 and servers 940 and 945, communication between client systems 910, 920, and 930 and storage devices 990(1)-(N) and/or intelligent storage array 995 in such a manner that devices 990(1)-(N) and array 995 appear as locally attached devices to client systems 910, 920, and 930. As with storage devices 960(1)-(N) and storage devices 970(1)-(N), storage devices 990(1)-(N) and intelligent storage array 995 generally represent any type or form of storage device or medium capable of storing data and/or other computer-readable instructions.

In certain embodiments, and with reference to computer system 810 of FIG. 8, a communication interface can be used to provide connectivity between each client system 920 and 930 and network 950. Client systems 910, 920 and 930 can be able to access information on server 940 or 945 using, for example, a web browser or other client software. Such software can allow client systems 910, 920 and 930 to access data hosted by server 940, server 945, storage devices 960(1)-(N), storage devices 970(1)-(N), storage devices 990(1)-(N), or intelligent storage array 995. Although FIG. 9 depicts the use of a network (such as the Internet) for exchanging data, the embodiments described and/or illustrated herein are not limited to the Internet or any particular network-based environment.

In at least one embodiment, all or a portion of one or more of the embodiments disclosed herein can be encoded as a computer program and loaded onto and executed by server 940, server 945, storage devices 960(1)-(N), storage devices 970(1)-(N), storage devices 990(1)-(N), intelligent storage array 995, or any combination thereof. All or a portion of one or more of the embodiments disclosed herein can also be encoded as a computer program, stored in and run by server 940 and server 945, and distributed to client systems 910, 920 and 930 over network 950.

In some examples, all or a portion of the computing devices in FIGS. 1, 8, and 9 can represent portions of a cloud-computing or network-based environment. Cloud-computing environments can provide various services and applications via the Internet. These cloud-based services (e.g., software as a service, platform as a service, infrastructure as a service, etc.) can be accessible through a web browser or other remote interface. Various functions described herein can be provided through a remote desktop environment or any other cloud-based computing environment.

In addition, one or more of the components described herein can transform data, physical devices, and/or representations of physical devices from one form to another. For example, a snapshot backup 150 in FIG. 1 can transform information received from a client system into a new backup image.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   generating a first snapshot virtual disk of a virtual disk in which a base backup image is stored, wherein
      the base backup image comprises client data,
      a track log is associated with the base backup image, wherein
         the track log comprises a plurality of fingerprints associated with a plurality of data items in the client data, and
         a plurality of times associated with the plurality of data items, and
         the track log is configured to be used in identifying first client data that has changed since the base backup image was created ("first changed client data") and first unchanged data that has not changed since the base backup image was created ("first unchanged client data"), and
      the first snapshot virtual disk comprises information that identifies a location of each of a plurality of portions of the client data within the base backup image;
   storing a first streamlined backup image as a backup image file in the first snapshot virtual disk, wherein
      the first streamlined backup image is associated with the base backup image, and
      the first streamlined backup image comprises the first changed client data and first metadata identifying the first unchanged client data;
   analyzing the first metadata identifying the first unchanged client data in the first streamlined backup image to identify one or more portions of the plurality of portions of the base backup image that are not referenced by the first streamlined backup image; and
   removing the one or more portions from the first snapshot virtual disk, wherein
      the removing the one or more portions from the first snapshot virtual disk comprises deleting one or more snapshot pointers of a representation of the base backup image,
      the one or more snapshot pointers correspond to the one or more portions, and the one or more snapshot pointers each refer to a portion of the base backup image in a base storage unit;

determining whether the base backup image has expired; and subsequent to a determination that the base backup image has expired,
generating a second backup image file, wherein
the second backup image file comprises one or more data items in the base backup image that are referenced by the first streamlined backup image,
deleting the base backup image, and
storing the second backup image file in a second snapshot virtual disk.

2. The method of claim 1, wherein
a representation of the base backup image is stored in the first snapshot virtual disk, as a result of the generating the first snapshot virtual disk,
the first streamlined backup image comprises a plurality of metadata references, and
each of the plurality of metadata references refers to a respective portion of the representation of the base backup image.

3. The method of claim 2, wherein
each portion of the representation of the base backup image comprises at least one of
a metadata reference to another portion within the representation of the base backup image, and
a snapshot pointer that refers to the virtual disk.

4. The method of claim 1, wherein
the base backup image comprises
a child backup image, and
a representation of a parent backup image,
the child backup image comprises a second plurality of metadata references, and
each of the second plurality of metadata references refers to a respective portion of the representation of the parent backup image.

5. The method of claim 4, wherein
the parent backup image is stored on a different unit distinct from the virtual disk, and each portion of the representation of the parent backup image comprises at least one of
a metadata reference to another portion within the representation of the parent backup image, and
a virtual disk snapshot pointer that refers to a corresponding portion of the parent backup image in the different unit.

6. A non-transitory computer readable storage medium configured to store program instructions that, when executed on a processor, are configured to cause the processor to perform a method comprising:
generating a first snapshot virtual disk of a virtual disk in which a base backup image is stored, wherein
the base backup image comprises client data, and
a track log is associated with the base backup image, wherein
the track log comprises a plurality of fingerprints associated with a plurality of data items in the client data, and
a plurality of times associated with the plurality of data items, and
the track log is configured to be used in identifying first client data that has changed since the base backup image was created ("first changed client data") and first unchanged data that has not changed since the base backup image was created ("first unchanged client data"), and
the first snapshot virtual disk comprises information that identifies a location of each of a plurality of portions of the client data within the base backup image;

storing a first streamlined backup image as a backup image file in the first snapshot virtual disk, wherein
the first streamlined backup image is associated with the base backup image, and
the first streamlined backup image comprises the first changed client data and first metadata identifying the first unchanged client data;

analyzing the first metadata identifying the first unchanged client data in the first streamlined backup image to identify one or more portions of the plurality of portions of the base backup image that are not referenced by the first streamlined backup image; and removing the one or more portions from the first snapshot virtual disk-snapshot, wherein
the removing the one or more portions from the first snapshot virtual disk comprises deleting one or more snapshot pointers of a representation of the base backup image, wherein
the one or more snapshot pointers correspond to the one or more portions, and
the one or more snapshot pointers each refer to a portion of the base backup image in a base storage unit;

determining whether the base backup image has expired; and subsequent to a determination that the base backup image has expired,
generating a second backup image file, wherein
the second backup image file comprises one or more data items in the base backup image that are referenced by the first streamlined backup image,
deleting the base backup image, and
storing the second backup image file in a second snapshot virtual disk.

7. The non-transitory computer readable storage medium of claim 6, wherein
a representation of the base backup image is stored in the first snapshot virtual disk, as a result of the generating the first snapshot virtual disk,
the first streamlined backup image comprises a plurality of metadata references, and
each of the plurality of metadata references refers to a respective portion of the representation of the base backup image.

8. The non-transitory computer readable storage medium of claim 7, wherein
each portion of the representation of the base backup image comprises at least one of
a metadata reference to another portion within the representation of the base backup image, and
a snapshot pointer that refers to the virtual disk.

9. The non-transitory computer readable storage medium of claim 6, wherein
the base backup image comprises
a child backup image, and
a representation of a parent backup image,
the child backup image comprises a second plurality of metadata references, and
each of the second plurality of metadata references refers to a respective portion of the representation of the parent backup image.

10. The non-transitory computer readable storage medium of claim 9, wherein
- the parent backup image is stored on a different unit distinct from the virtual disk, and
- each portion of the representation of the parent backup image comprises at least one of
  - a metadata reference to another portion within the representation of the parent backup image, and
  - a virtual disk snapshot pointer that refers to a corresponding portion of the parent backup image in the different unit.

11. An apparatus comprising:
a snapshot backup module configured to
- generate a first snapshot virtual disk of a virtual disk in which a base backup image is stored, wherein
  - the base backup image comprises client data, and
  - a track log is associated with the base backup image, wherein
    - the track log comprises a plurality of fingerprints associated with a plurality of data items in the client data, and
    - a plurality of times associated with the plurality of data items, and
    - the track log is configured to be used in identifying first client data that has changed since the base backup image was created ("first changed client data") and first unchanged data that has not changed since the base backup image was created ("first unchanged client data"), and
  - the first snapshot virtual disk comprises information that identifies a location of each of a plurality of portions of the client data within the base backup image;
- store a first streamlined backup image as a backup image file in the first snapshot virtual disk, wherein
  - the first streamlined backup image is associated with the base backup image, and
  - the first streamlined backup image comprises the first changed client data and first metadata identifying the first unchanged client data;
- analyze the first metadata identifying the first unchanged client data in the first streamlined backup image to identify one or more portions of the plurality of portions of the base backup image that are not referenced by the first streamlined backup image; and
- remove the one or more portions from the first snapshot virtual disk, wherein
  - removing the one or more portions from the first snapshot virtual disk comprises deleting one or more snapshot pointers of a representation of the base backup image, wherein
    - the one or more snapshot pointers correspond to the one or more portions, and
    - the one or more snapshot pointers each refer to a portion of the base backup image in a base storage unit;
- determine whether the base backup image has expired; and
- subsequent to a determination that the base backup image has expired,
  - generate a second backup image file, wherein
    - the second backup image file comprises one or more data items in the base backup image that are referenced by the first streamlined backup image,
  - delete the base backup image, and
  - store the second backup image file in a second snapshot virtual disk.

12. The apparatus of claim 11, wherein
- a representation of the base backup image is stored in the first snapshot virtual disk, as a result of generating the first snapshot virtual disk,
- the first streamlined backup image comprises a plurality of metadata references, and
- each of the plurality of metadata references refers to a respective portion of the representation of the base backup image.

13. The apparatus of claim 12, wherein
each portion of the representation of the base backup image comprises at least one of
- a metadata reference to another portion within the representation of the base backup image, and
- a snapshot pointer that refers to the virtual disk.

14. The apparatus of claim 11, wherein
the base backup image comprises
- a child backup image, and
- a representation of a parent backup image,
the child backup image comprises a second plurality of metadata references, and
each of the second plurality of metadata references refers to a respective portion of the representation of the parent backup image.

15. The apparatus of claim 14, wherein
the parent backup image is stored on a different unit distinct from the virtual disk, and
each portion of the representation of the parent backup image comprises at least one of
- a metadata reference to another portion within the representation of the parent backup image, and
- a virtual disk snapshot pointer that refers to a corresponding portion of the parent backup image in the different unit.

* * * * *